United States Patent
Kim et al.

(10) Patent No.: US 11,395,341 B2
(45) Date of Patent: Jul. 19, 2022

(54) METHOD FOR PERFORMING RANDOM ACCESS PROCESS AND DEVICE THEREFOR

(71) Applicant: LG Electronics Inc., Seoul (KR)

(72) Inventors: Jaehyung Kim, Seoul (KR); Joonkui Ahn, Seoul (KR); Byounghoon Kim, Seoul (KR); Changhwan Park, Seoul (KR); Seokmin Shin, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 16/637,544

(22) PCT Filed: Aug. 9, 2018

(86) PCT No.: PCT/KR2018/009084
§ 371 (c)(1),
(2) Date: Feb. 7, 2020

(87) PCT Pub. No.: WO2019/031864
PCT Pub. Date: Feb. 14, 2019

(65) Prior Publication Data
US 2020/0245363 A1    Jul. 30, 2020

Related U.S. Application Data

(60) Provisional application No. 62/574,223, filed on Oct. 19, 2017, provisional application No. 62/543,353, filed on Aug. 9, 2017.

(51) Int. Cl.
*H04W 74/08* (2009.01)
*H04B 1/713* (2011.01)

(52) U.S. Cl.
CPC ........ *H04W 74/0833* (2013.01); *H04B 1/713* (2013.01)

(58) Field of Classification Search
CPC ........... H04W 74/0833; H04W 74/006; H04W 74/08; H04W 74/0866; H04B 1/713; H04L 5/0012; H04L 5/0053
See application file for complete search history.

(56) References Cited

U.S. PATENT DOCUMENTS

2017/0202028 A1    7/2017  Gaal et al.
2018/0131547 A1*   5/2018  Wang .................. H04W 74/008
(Continued)

FOREIGN PATENT DOCUMENTS

EP      3621398       3/2020
EP      3621403       3/2020
(Continued)

OTHER PUBLICATIONS

Huawei, HiSilicon, "On support of larger cell radius for NPRACH", R1-1707025, 3GPP TSG RAN WG1 Meeting #89, Hangzhou, China, May 15-19, 2017, 5 pages.
PCT International Search Report and Written Opinion in International Application No. PCT/KR2018/009084, dated Dec. 6, 2018, 9 pages.
(Continued)

*Primary Examiner* — Walli Z Butt
(74) *Attorney, Agent, or Firm* — Fish & Richardson P.C.

(57) ABSTRACT

The present invention relates to a method for performing a random access process in a wireless communication system, and a device therefor and, more specifically, to a method and a device therefor, the method comprising the steps of: receiving narrowband physical random access channel (NPRACH) configuration information; and transmitting a random access preamble on the basis of the received NPRACH configuration information, wherein a sub-carrier spacing for the random access preamble is set to 3.75/N kHz, where N is an integer greater than or equal to 3, the random
(Continued)

access preamble includes multiple symbol groups, the multiple symbol groups are transmitted on the basis of frequency-hopping, and a frequency-hopping distance between each of the multiple symbol groups includes a value between 3.75/N kHz and 6*3.75 kHz.

4 Claims, 22 Drawing Sheets

(56)  References Cited

U.S. PATENT DOCUMENTS

| | | | | |
|---|---|---|---|---|
| 2018/0288810 | A1* | 10/2018 | Ishii | H04W 48/12 |
| 2019/0075602 | A1* | 3/2019 | Lin | H04W 74/0841 |
| 2019/0306887 | A1* | 10/2019 | Rathonyi | H04W 72/0453 |
| 2019/0349985 | A1* | 11/2019 | Lin | H04L 27/2613 |
| 2020/0163111 | A1* | 5/2020 | Luo | H04L 5/0044 |

FOREIGN PATENT DOCUMENTS

| | | |
|---|---|---|
| KR | 20130083708 | 7/2013 |
| WO | WO 2017/119943 | 7/2017 |

OTHER PUBLICATIONS

Qualcomm Incorporated, "Codebook based UL transmission", R1-1705576, 3GPP TSG RAN WG1 #88bis, Apr. 3-7, 2017, Spokane, USA, 3 pages.

Qualcomm Incorporated, "NPRACH support for large cell access", R1-1708806, 3GPP TSG RAN1 #89, May 15-19, 2017, Hangzhou, Zhejiang, China, 3 pages.

Qualcomm Incorporated, "On DL Transmission Schemes 2", R1-1705575, 3GPP TSG RAN WG1 RAN1 #88bis, Apr. 3-7, 2017, Spokane, Washington, USA, 5 pages.

Partial Search Report in European Patent Application No. 18844167.9, dated Jun. 22, 2020, 12 pages.

Qualcomm Incorporated, "NPRACH Reliability Enhancement," R1-1708881, 3GPP TSG RAN1 #89, May 15-19, 2017, Hangzhou, Zhejiang, China, 3 pages.

Extended European Search Report in European Application No. 18844167.9, dated Aug. 20, 2020, 11 pages.

LG Electronics, "Resource configuration for NPRACH enhancement," R1-1713106, Presented at 3GPP TSG RAN WG1 Meeting #90, Prague, Czech Republic, Aug. 21-25, 2017, 8 pages.

Qualcomm Incorporated, "NPRACH Reliability Enhancement," R1-1708881, Presented at 3GPP TSG RAN1 #89, May 15-19, 2017, Hangzhou, Zhejiang, China, 3 pages.

* cited by examiner

FIG. 20
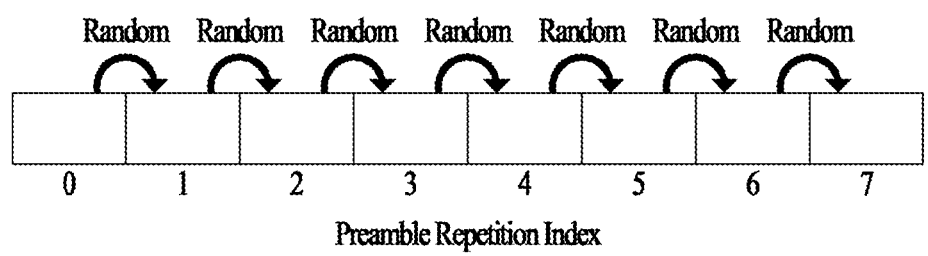
(a)
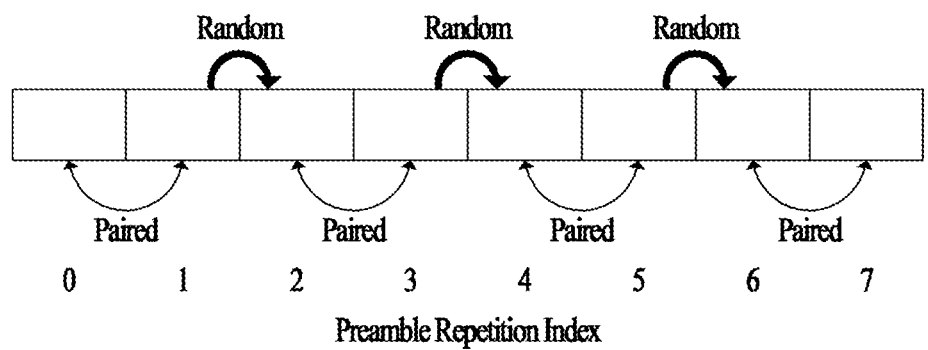
(b)

FIG. 22
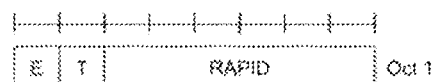
(a)
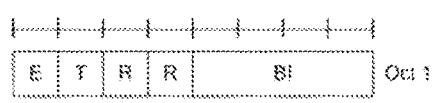
(b)
FIG. 23
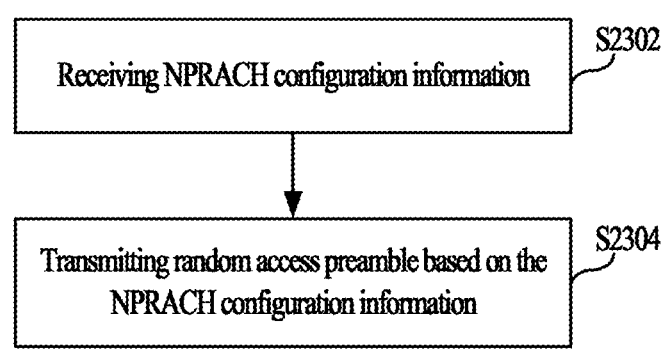

METHOD FOR PERFORMING RANDOM ACCESS PROCESS AND DEVICE THEREFOR

CROSS-REFERENCE TO RELATED APPLICATIONS

This application is a National Stage application under 35 U.S.C. § 371 of International Application No. PCT/KR2018/009084, filed on Aug. 9, 2018, which claims the benefit of U.S. Provisional Application No. 62/574,223, filed on Oct. 19, 2017, and U.S. Provisional Application No. 62/543,353, filed on Aug. 9, 2017. The disclosures of the prior applications are incorporated by reference in their entirety.

TECHNICAL FIELD

The present disclosure relates to a wireless communication system. More specifically, the present disclosure relates to a method of performing a random access procedure for effective coverage enhancement and an apparatus therefor.

BACKGROUND ART

When a new radio access technology (RAT) system is introduced, as more and more communication devices require larger communication capacity, there is a need for improved mobile broadband communication as compared to existing RAT. In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, considering enhanced mobile broadband communication (eMBB), massive MTC (mMTC), URLLC (Ultra-Reliable Low-Latency Communication), etc, the next generation wireless access technology is being discussed, and such a technology is referred to as new RAT (NR) for convenience.

DISCLOSURE

Technical Problem

An object of the present disclosure is to provide a method for performing a random access procedure for effective range enhancement in a wireless communication system, and an apparatus therefor.

Another object of the present disclosure is to provide a method for random access preamble resource allocation and frequency hopping for minimizing interference between preambles having different formats and interference between different preambles having the same format in a wireless communication system, and a device therefor.

Another object of the present disclosure is to provide a method for efficient frequency hopping between random access preambles in a wireless communication system, and a device therefor.

Another object of the present disclosure is to provide a method for resource mapping and/or sharing between a legacy preamble and an enhanced preamble in a wireless communication system, and a device therefor.

It will be understood by persons skilled in the art that the objects that can be achieved with the present disclosure are not limited to what has been particularly described herein above and other objects that the present disclosure can achieve will be more clearly understood from the following detailed description.

Technical Solution

In a first aspect of the present disclosure, provided herein is a method for performing a random access procedure by a user equipment in a wireless communication system. The method may include receiving narrowband physical random access channel (NPRACH) configuration information, and transmitting a random access preamble based on the received NPRACH configuration information, wherein subcarrier spacing for the random access preamble may be set to 3.75/N kHz, where N may be an integer greater than or equal to 3, wherein the random access preamble may include a plurality of symbol groups, the plurality of symbol groups being transmitted based on frequency hopping, and wherein a frequency hopping distance between the plurality of symbol groups may include a value between 3.75/N kHz and 6*3.75 kHz.

In a second aspect of the present disclosure, provided herein is a user equipment for performing a random access procedure in a wireless communication system. The user equipment may include a radio frequency (RF) transceiver, and a processor operatively connected to the RF transceiver. The processor may be configured to receive narrowband physical random access channel (NPRACH) configuration information, and transmit a random access preamble based on the received NPRACH configuration information, wherein subcarrier spacing for the random access preamble may be set to 3.75/N kHz, where N may be an integer greater than or equal to 3, wherein the random access preamble may include a plurality of symbol groups, the plurality of symbol groups being transmitted based on frequency hopping, and wherein a frequency hopping distance between the plurality of symbol groups may include a value between 3.75/N kHz and 6*3.75 kHz.

The subcarrier spacing for the random access preamble may be set to 1.25 kHz.

An NPRACH resource may include 36 subcarriers, wherein the frequency hopping may be performed within the 36 subcarriers.

The value may be set to 3*3.75 kHz.

The plurality of symbol groups may include symbol group 0, symbol group 1, symbol group 2, and symbol group 3, wherein a frequency hopping distance between the symbol group 0 and the symbol group 1 may be set to 3.75/N kHz, and a frequency hopping distance between the symbol group 1 and the symbol group 2 may be set to the value.

The user equipment may be configured to receive a random access response message in response to the random access preamble, wherein the random access response message may be received based on different random access radio network temporary identifiers (RA-RNTIs) for a first preamble format and a second preamble format.

The user equipment may be configured to receive a random access response message in response to the random access preamble, wherein the random access response message may have different random access preamble identifiers (RAPIDs) for a first preamble format and a second preamble format.

Advantageous Effects

According to the present disclosure, a range may be effectively enhanced in performing a random access procedure in a wireless communication system.

Further, according to the present disclosure, interference between preambles having different formats and interference between different preambles having the same format may be minimized in a wireless communication system.

Further, according to the present disclosure, frequency hopping may be effectively performed between random access preambles in a wireless communication system.

Further, according to the present disclosure, resource mapping and/or sharing between a legacy preamble and an enhanced preamble may be implemented in a wireless communication system.

It will be understood by those skilled in the art that the objects that can be achieved with the present disclosure are not limited to what has been particularly described hereinabove and other objects that the present disclosure can achieve will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

FIGS. 9 to 17 illustrate an NPRACH resource allocation and frequency hopping method according to the present disclosure.

FIGS. 18 to 20 illustrate a random inter-preamble frequency hopping method according to the present disclosure.

FIG. 22 illustrates a RAR message header for a legacy UE.

FIG. 23 illustrates a flowchart of a method for performing a random access procedure according to the present disclosure.

BEST MODE

Figure 1:
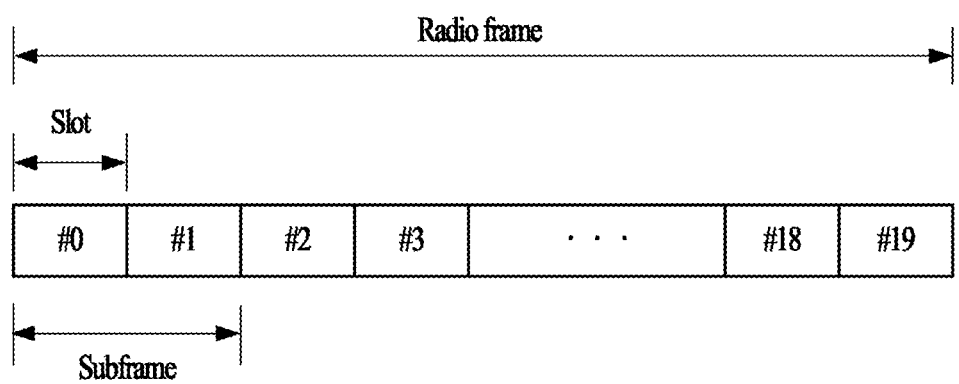
FIG. 1 illustrates a structure of a radio frame that may be used in the present disclosure.

The following embodiments of the present disclosure can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access network (UTRAN) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRAN (E-UTRAN). UTRAN is a part of universal mobile telecommunications system (UMTS). 3rd generation partnership project (3GPP) long term evolution (LTE) is a part of E-UMTS (Evolved UMTS), which uses E-UTRAN. 3GPP LTE-Advanced (LTE-A) system is an evolved version of 3GPP LTE, and LTE-A Pro system is an evolved version of 3GPP LTE-A.

For clarity of explanations, the following description focuses on 3GPP LTE/LTE-A/LTE-A Pro system. However, technical principles of the present disclosure are not limited thereto. Further, a particular terminology is provided for better understanding of the present disclosure. However, such a particular terminology may be changed without departing from the technical principles of the present disclosure. For example, the present disclosure may be applied to a system in accordance with a 3GPP LTE/LTE-A/LTE-A Pro system as well as a system in accordance with another 3GPP standard, IEEE 802.xx standard, 3GPP2 standard, or a next-generation communication system such as 3GPP 5G or New RAT (NR).

In the present specification, a user equipment (UE) may be fixed or mobile, and may be various kinds of equipment that transmit and receive data and/or control information to communicate with a base station (BS). The UE may be referred to as a terminal, mobile station (MS), mobile terminal (MT), user terminal (UT), subscribe station (SS), wireless device, personal digital assistant (PDA), wireless modem, handheld device, etc. In the present specification, a UE may be interchangeably referred to as a terminal.

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), next generation NodeB (gNB), a base transceiver system (BTS), an access point (AP), a processing server (PS), a transmission point (TP), etc. In the present specification, a base station (BS) may be interchangeably referred to as an eNB or gNB.

In a wireless access system, a user equipment (UE) may receive information from a base station (B S) in downlink (DL) and transmit information in uplink (UL). The information transmitted or received by the UE may include data and various control information. In addition, there are various physical channels according to the type or use of the information transmitted or received by the UE.

When a UE is powered on or enters a new cell, the UE performs initial cell search. The initial cell search involves acquisition of synchronization to a base station. To this end, the UE synchronizes its timing to the base station and acquires information such as a cell identifier (ID) by receiving a primary synchronization signal (PSS) and a secondary synchronization signal (SSS) from the base station. Then the UE may acquire system information broadcasted in the cell through a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH.

To complete access to the base station, the UE may perform a random access procedure with the base station. To this end, the UE may transmit a preamble through a physical random access channel (PRACH) and may receive a response message to the preamble through a PDCCH and a PDSCH associated with the PDCCH. In the case of a contention-based random access, the UE may additionally perform a contention resolution procedure including transmission of an additional PRACH and reception of a PDCCH signal and a PDSCH signal corresponding to the PDCCH signal.

After the above procedure, the UE may receive a PDCCH and/or a PDSCH from the base station and transmit a physical uplink shared channel (PUSCH) and/or a physical uplink control channel (PUCCH) to the base station, in a general UL/DL signal transmission procedure. Information that the UE transmits to the base station is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted through a PUCCH periodically. However, if control information and traffic data should be transmitted simultaneously, they may be transmitted through a PUSCH. In addition, the UCI may be transmitted aperiodically through the PUSCH, upon receipt of a request/command from a network.

FIG. 1 illustrates a structure of a radio frame that may be used in the present disclosure. In a cellular orthogonal frequency division multiplexing (OFDM) radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 1 illustrates the structure of the type-1 radio frame. For example, a downlink radio frame includes 10 subframes and one subframe includes two slots in a time domain. A time required to transmit one subframe is referred to as a transmission time interval (TTI). Or, TTI may refer to a time interval required to transmit one slot. For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol period. The OFDM symbol may be referred to as an SC-FDMA symbol or symbol period. A resource block (RB) as a resource allocation unit may include a plurality of consecutive subcarriers in one slot.

The number of OFDM symbols included in one slot may vary according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a base station and uplink transmission synchronization of a UE. For example, the uplink slot (e.g., UpPTS) may be used to transmit a sounding reference signal (SRS) for channel estimation in a base station and to transmit a physical random access channel (PRACH) that carriers a random access preamble for uplink transmission synchronization. The GP is used to eliminate interference generated in uplink due to multi-path delay of a downlink signal between uplink and downlink.

The above-described radio frame structures are purely exemplary, and thus the number of subframes in a radio frame, the number of slots in a subframe, or the number of symbols in a slot may vary in different ways.

Figure 2:
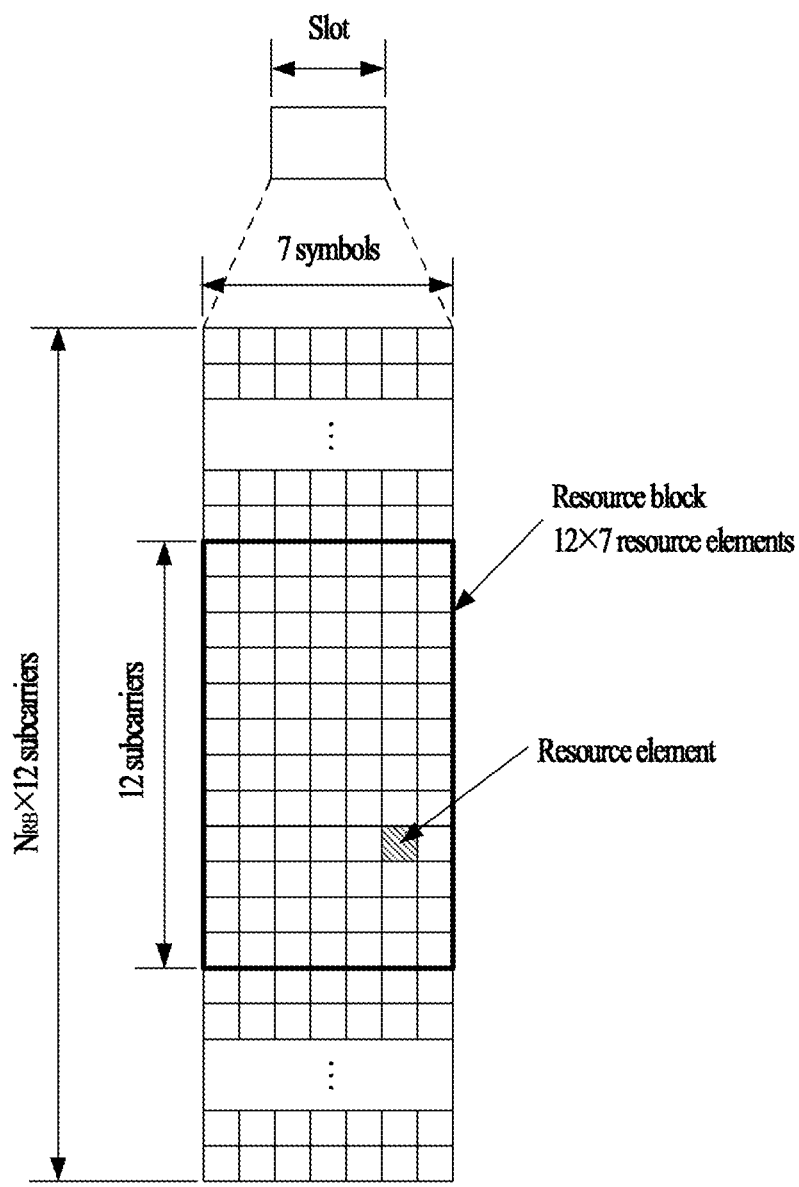
FIG. 2 illustrates a resource grid of a downlink slot that may be used in the present disclosure.

FIG. 2 illustrates a resource grid of one downlink slot that may be used in the present disclosure.

Referring to FIG. 2, a downlink slot includes a plurality of OFDM symbols in the time domain. One downlink slot may include 7 OFDM symbols and a resource block (RB) may include 12 subcarriers in the frequency domain. However, the present disclosure is not limited thereto. Each element of the resource grid is referred to as a Resource Element (RE). One RB includes 12×7 REs. The number of RBs in a DL slot, $N^{DL}$, depends on a downlink transmission bandwidth. An uplink slot may have the same structure as a downlink slot.

The above-described resource grid of a slot is exemplary, and thus the number of symbols, the number of resource elements, the number of RBs included in the slot may vary in different ways.

Figure 3:
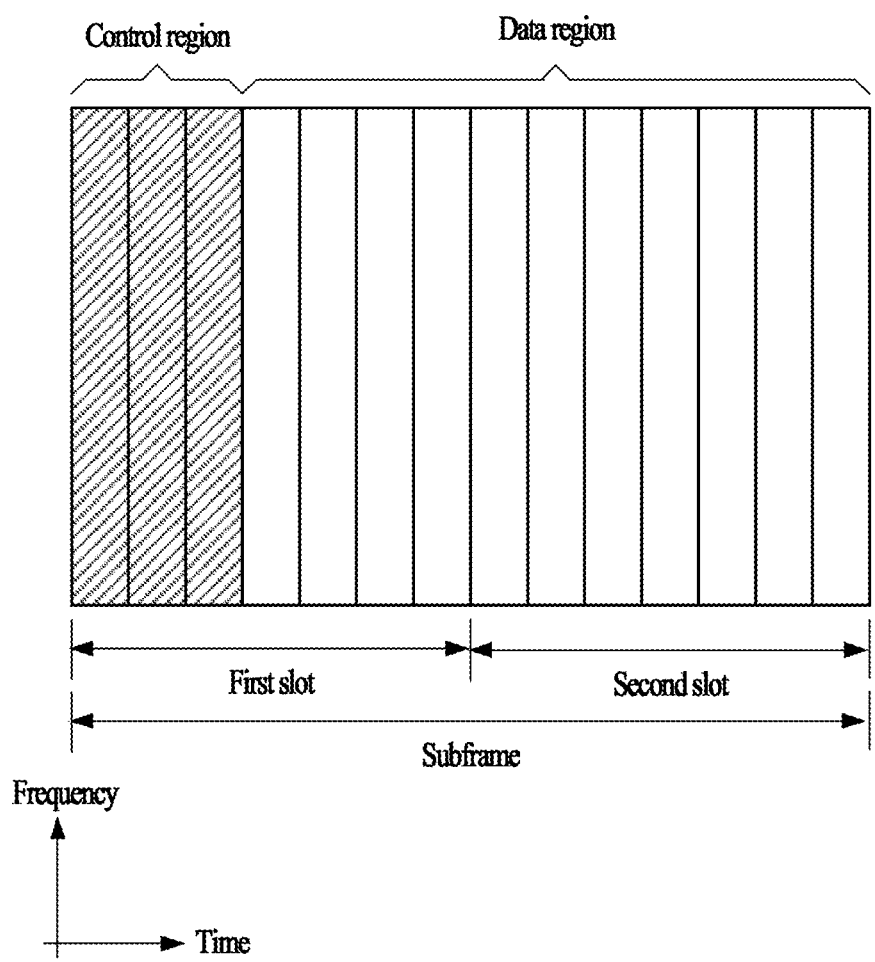
FIG. 3 illustrates a downlink subframe structure that may be used in the present disclosure.

FIG. 3 illustrates a downlink subframe structure that may be used in the present disclosure.

Referring to FIG. 3, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs), and each REG is uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ ACK/NACK signal. The PHICH is allocated on the remaining REGs other than CRS and PCFICH (a first OFDM symbol) in one or more OFDM symbols configured by PHICH duration. The PHICH is allocated to three REGs that are distributed if possible in the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

The base station determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH is for uplink power control, transmit power control-RNTI (TPC-RNTI) may be used, and the TPC-RNTI may include TPC-PUCCH-RNTI for PUCCH power control and TPC-PUSCH-RNTI for PUSCH power control. When the PDCCH is for multicast control channel (MCCH), multimedia broadcast multicast service-RNTI (M-RNTI) may be used.

Control information transmitted through the PDCCH is referred to as downlink control information (DCI). Various DCI formats are defined according to their usage. Specifically, DCI format 0, 4 (hereinafter, UL grant) are defined for uplink scheduling, and DCI formats 1, 1A, 1B, 1C, 1D, 2, 2A, 2B, 2C, and 2D (hereinafter, DL grant) are defined for downlink scheduling. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH.

Figure 4:
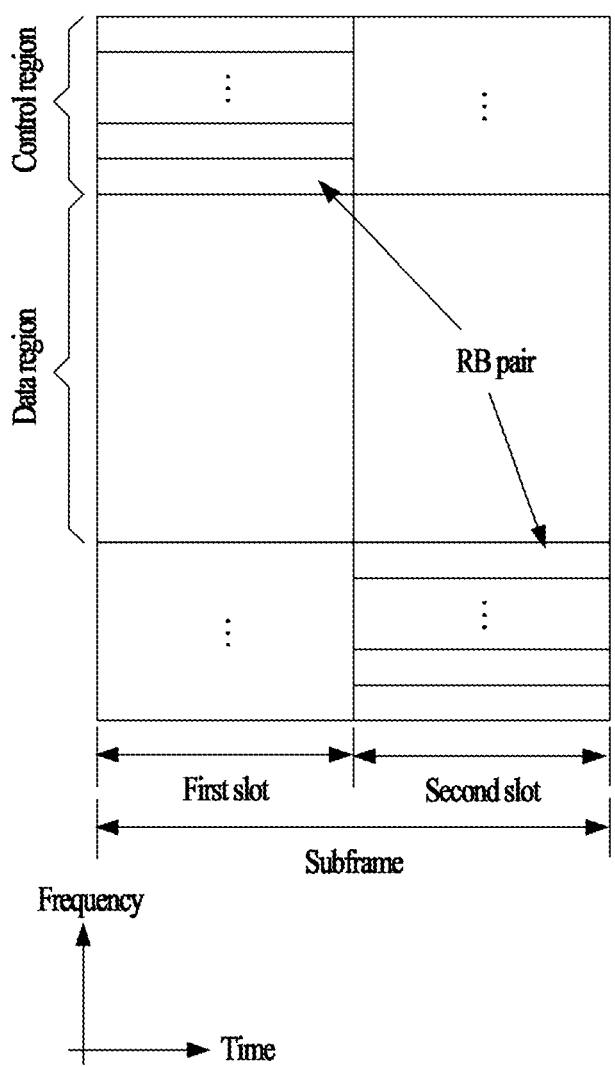
FIG. 4 illustrates an uplink subframe structure that may be used in the present disclosure.

FIG. 4 illustrates an exemplary structure of an uplink subframe that may be used in the present disclosure.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis, and performs hopping on the border of the slots.

Figure 5:
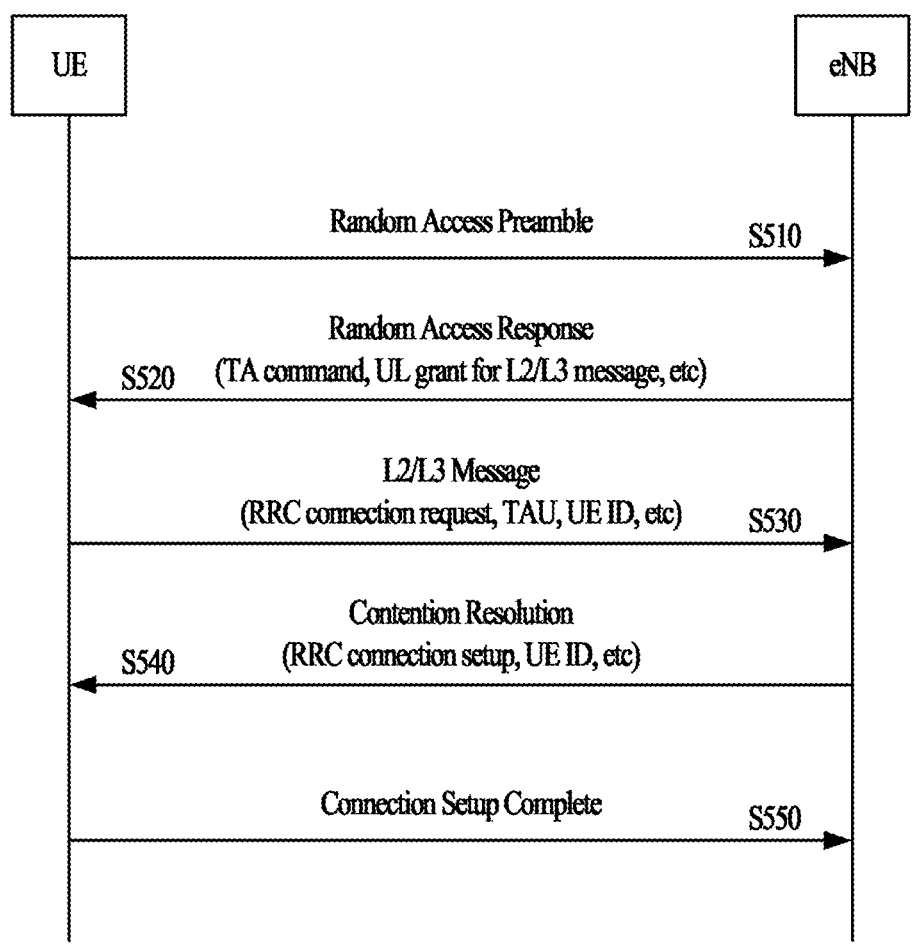
FIG. 5 illustrates a random access procedure.

FIG. 5 illustrates a random access procedure.

The random access procedure is used to transmit (short-length) data in uplink. For example, the random access procedure is performed upon initial access in an RRC_IDLE state, upon initial access after radio link failure, upon handover requiring the random access procedure, and upon the occurrence of uplink/downlink data requiring the random access procedure during an RRC_CONNECTED state. Some Radio Resource Control (RRC) messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

With reference to FIG. 5, a UE receives and stores information regarding random access from a base station through system information. Thereafter, when random access is needed, the UE transmits a random access preamble (referred to as Message 1 or Msg1) to the base station (S510). Upon receiving the random access preamble from the UE, the base station transmits a random access response message (referred to as Message 2 or Msg2) to the UE (S520). Specifically, downlink scheduling information for the random access response message may be CRC-masked with a Random Access-RNTI and may be transmitted through an L1/L2 control channel (PDCCH). Upon receiving the downlink scheduling signal masked with the RA-RNTI, the UE may receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (referred to as Message 3 or Msg3) including an RRC connection request message through an uplink Shared Channel (SCH) according to radio resource allocation information included in the response information (S530). After receiving the uplink message from the UE, the base station transmits a message for contention resolution (referred to as Message 4 or Msg4) to the UE (S540). The message for contention resolution may be referred to as a contention resolution message, and may include an RRC connection setup message. After the UE receives the contention resolution message, the UE transmits a connection setup complete message (referred to as Message 5 or Msg5) to the base station (S550).

In case of a non-contention based procedure, a base station may allocate a non-contention random access preamble to a UE before the UE transmits a random access preamble (S510). The non-contention random access preamble may be allocated through a dedicated signaling such as a handover command or PDCCH. In case that a UE is allocated with a non-contention random access preamble, the UE may transmit the allocated non-contention random access preamble to a base station in a similar manner as S510. If the base station receives the non-contention random access preamble from the UE, the base station may transmit a random access response (referred to as Message 2) to the UE in a similar manner as S520.

During the above-described random access procedure, HARQ may not be applied to a random access response (S520), but HARQ may be applied to an uplink transmission for the random access response or a message for contention resolution. Thus, the UE does not have to transmit ACK/NACK in response the random access response.

A next generation of LTE-A system is considering to configure a user equipment (UE) at a low cost/low specification mainly focusing on data communication such as metering of a gauge meter, measurement of a water level, utilization of a monitoring camera, inventory report of a vending machine, and the like. Such a UE is to provide appropriate throughputs between connected devices even though it has a low complexity and consumes low power, and the UE is referred to as a machine type communication (MTC) UE or IoT (Internet of Things) UE for convenience, and the UE may be briefly referred to as a user equipment (UE).

Further, when the next generation system utilizes a cellular network or a third-party network, the next generation system can perform communication using a narrow band (or NB-IoT communication). For example, the narrow band may be 180 kHz. A UE (or NB-IoT UE) or an eNB transmits a single channel or a plurality of physical channels by multiplexing the channel(s) in a corresponding region. Meanwhile, the NB-IoT UE can perform communication even in such an area where channel environment is poor as under a bridge, under the sea, on the sea, and the like. In this case, in order to compensate for the poor channel environment, the NB-IoT UE may perform repetitive transmission on a specific channel (e.g., repetitive transmission during several TTIs) and/or perform power boosting. As an example of the power boosting, a region of a frequency resource to be transmitted on a specific band is more reduced to concentrate power per hour on a specific resource. For example, when a specific channel is transmitted via an RB (resource block) consisting of 12 REs, it may concentrate power to be distributed via the entire RB on a specific RE(s) by allocating the power to the specific RE instead of RE allocation in an RB unit. In particular, a scheme of performing communication by concentrating data and power on a single RE belonging to an RB is commonly referred to as a single-tone transmission scheme. NB-IoT may be interchangeably referred to as cellular IoT (cIoT).

Figure 6:
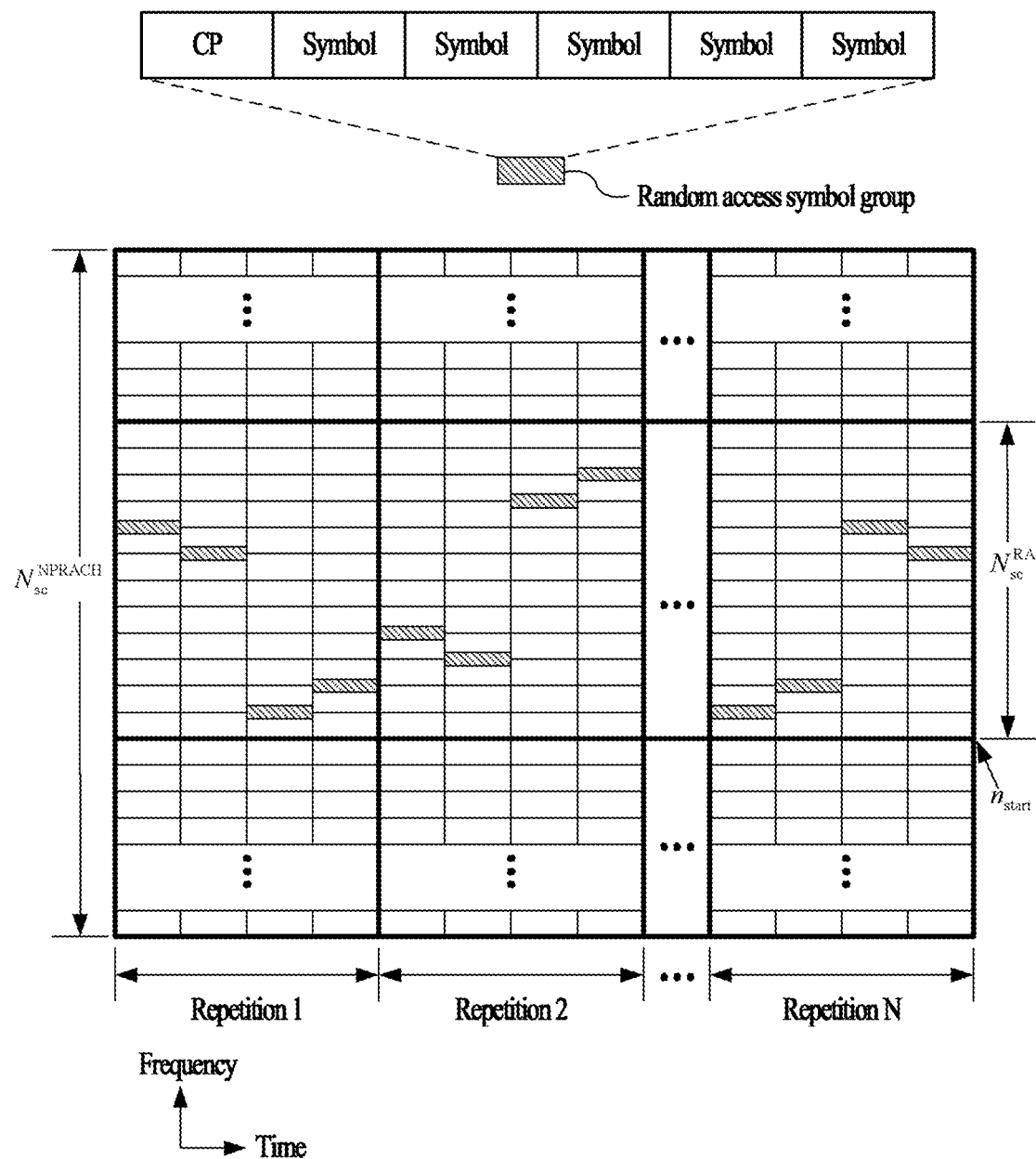
FIG. 6 illustrates an NPRACH preamble transmission method.

FIG. 6 illustrates an NPRACH preamble transmission method. The NPRACH preamble refers to a PRACH preamble for NB-IoT supported by the LTE-A Pro system and may be collectively referred to as a PRACH preamble. The random access symbol group of FIG. 6 may be referred to as an (N)PRACH symbol group, or simply as a symbol group.

The NPRACH preamble may be composed of four symbol groups (symbol group 0 to symbol group 3), and each symbol group may be composed of a cyclic prefix (CP) and a sequence part as illustrated in FIG. 6. The sequence part may consist of five subblocks, each of the subblocks including the same symbol. For example, the same symbol may have a fixed symbol value of 1.

The NPRACH preamble may be transmitted based on designated time/frequency resources. The time/frequency resources for transmission of the NPRACH preamble may be configured through NPRACH configuration information. The NPRACH configuration information may be transmitted to a user equipment through a higher layer signal (e.g., an RRC layer signal) or system information (e.g., SIB2). The NPRACH configuration information may include the following information:

Information (e.g., $N_{period}^{NPRACH}$ perod or nprach-Periodicity) indicating the periodicity of the NPRACH resource in the time domain;

Information (e.g., $N_{scoffset}^{NPRACH}$ or nprach-Subcarrier-Offset) indicating the first subcarrier of the NPRACH resource in the frequency domain;

Information indicating the number of subcarriers allocated to the NPRACH (e.g., $N_{sc}^{NPRACH}$ or nprach-NumSubcarriers);

Information indicating the number of start subcarriers allocated to contention-based random access (e.g., $N_{sc\_cont}^{NPRACH}$ or nprach-NumCBRA-StartSubcarriers);

Information indicating the number of NPRACH repetitions (e.g., $N_{rep}^{NPRACH}$ or numRepetitionsPerPreambleAttempt);

Information indicating an NPRACH start time (e.g., $N_{start}^{NPRACH}$ or nprach-StartTime).

In the time domain, the NPRACH preamble transmission may start at a position indicated by $N_{start}^{NPRACH}$ after the start of a radio frame that satisfies $n_f \bmod (N_{period}^{NPRACH}/10)=0$.

The frequency region for transmission of the NPRACH preamble may be determined by a subcarrier offset (e.g., $N_{scoffset}^{NPRACH}$) and the number of subcarriers (e.g., $N_{sc}^{NPRACH}$) configured through a higher layer signal (e.g., an RRC layer signal) or system information (e.g., SIB2). Each symbol group constituting the NPRACH preamble is transmitted without a gap, and frequency hopping is performed in each symbol group within the designated frequency region. In frequency hopping, the frequency position of the (i+1)th symbol group (i.e., symbol group i, where i=0, 1, 2, 3) is denoted by $n_{sc}^{RA}(i)$ and may be determined by Equation 1.

$$n_{sc}^{RA}(i) = n_{start} + \tilde{n}_{SC}^{RA}(i) \quad \text{[Equation 1]}$$

In Equation 1, $n_{start}$ denotes a start subcarrier index of the NPRACH preamble and is determined by Equation 2. In Equation 1, $\tilde{n}_{SC}^{RA}(i)$ denotes a subcarrier offset and is determined by Equation 3. In Equation 2, $N_{sc}^{RA}=12$ may be given.

$$n_{start} = N_{scoffset}^{NPRACH} + \lfloor n_{init}/N_{sc}^{RA} \rfloor \cdot N_{sc}^{RA} \quad \text{[Equation 2]}$$

$$\tilde{n}_{sc}^{RA}(i) = \quad \text{[Equation 3]}$$

$$\begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1,3 \text{ and } \tilde{n}_{sc}^{RA}(i-1) \bmod 2 = 0 \\ \tilde{n}_{sc}^{RA}(i-1) - 1 & i \bmod 4 = 1,3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

In Equation 3, $\tilde{n}_{SC}^{RA}(0)$ denotes a subcarrier offset for symbol group 0 of the NPRACH preamble and is determined by Equation 4. In Equation 3, $c(n)$ is determined by Equation 5. In Equation 4, $n_{init}$ is a value selected from $\{0, 1, \ldots, N_{sc}^{NPRACH}-1\}$ by a higher layer (e.g., the MAC layer).

$$\tilde{n}_{SC}^{RA}(0) = n_{init} \bmod N_{sc}^{RA} \quad \text{[Equation 4]}$$

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 5]}$$

In Equation 5, $N_c=1600$, and $x_1(0)=1$, $x_1(n)=0$, n=1, 2, . . . , 30 may be given.

The NPRACH preamble may be repeatedly transmitted a specific number of times (e.g., N times in FIG. 6) for coverage enhancement or coverage extension. The specific number of repetitions may be configured through a higher layer signal (e.g., an RRC layer signal) or system information (e.g., SIB2). Four symbol groups constituting the NPRACH preamble (symbol group 0 to symbol group 3) are transmitted while hopping to a frequency position determined for each symbol group using Equations 1 to 5. After the first NPRACH preamble is transmitted in this way, each of the symbol groups of the second NPRACH preamble may also be transmitted through frequency hopping based on Equations 1 to 5. Using the same method, the NPRACH preamble may be repeatedly transmitted a specific number of times (e.g., N times). The frequency position of the first symbol group (i.e., symbol group 0) of each NPRACH preamble that is repeatedly transmitted may be randomly determined.

Since the symbol groups of the NPRACH preamble illustrated in FIG. 6 are transmitted without a gap, the guard time is not applied to the NPRACH preamble. Accordingly, for the NPRACH preamble illustrated in FIG. 6, a supported cell radius may be determined in consideration of the CP duration instead of the guard time. In general, the relationship between the cell radius and the round trip delay (RTD) may be represented by (Cell radius)=(Light speed)*(RTD/2), and the RTD corresponds to a guard time. Thus, the relationship between the cell radius and the CP duration may be represented by Equation 6.

$$\text{(Cell radius)} = \text{(Light speed)} * \text{(CP duration/2)} \quad \text{[Equation 6]}$$

Table 1 exemplarily shows approximate values of the CP duration and cell radius according to the NPRACH preamble formats. As exemplarily shown in Table 1, the NPRACH preamble formats may include formats 0 and 1. The NPRACH preamble formats may have the same sequence length and different CP durations. The CP duration may be configured through a higher layer signal (e.g., an RRC layer signal) or system information (e.g., SIB2), and the corresponding NPRACH preamble format may be determined according to the CP duration. In Table 1, 'us' denotes microseconds and 'km' denotes kilometers.

TABLE 1

| Preamble format | CP duration (us) | Sequence (us) | GT duration (us) | Max. cell radius (km) |
|---|---|---|---|---|
| 0 | 67.5 | 1333.33 | N/A | 10.1 |
| 1 | 266.7 | 1333.33 | N/A | 40.0 |

In addition, a guard time (GT) may be given in consideration of an RTD according to the cell radius. For example, when a UE at the edge of a cell and a UE at the center of the cell transmit a PRACH preamble in the same TTI (e.g., subframe or slot), a guard time may be given to ensure that the base station can receive the PRACH preamble of each UE within the corresponding TTI. In general, since the relationship between the cell radius and the RTD may be represented by (Cell radius)=(Light speed)*(RTD/2) and the RTD corresponds to a GT, the relationship between the cell radius and the GT may be represented by Equation 7.

$$\text{(Cell radius)} = \text{(Light speed)} * \text{(GT/2)} \quad \text{[Equation 7]}$$

Table 2 exemplarily shows approximate values of the CP duration, GT duration, and cell radius according to the preamble formats of the legacy LTE/LTE-A system. In Table 2, the preamble format values are indicated by the PRACH configuration indexes. Preamble format 0 may be transmitted in one TTI (e.g., 1 ms), preamble formats 1 and 2 may be transmitted in two TTIs (e.g., 2 ms), and preamble format 3 may be transmitted in three TTIs (e.g., 3 ms). Here, 'ms' denotes milliseconds. In Table 2, 'us' denotes microseconds and 'km' denotes kilometers.

TABLE 2

| Preamble format | CP duration (us) | GT duration (us) | Max. delay spread (us) | Max. cell radius (km) |
|---|---|---|---|---|
| 0 | 103.1 | 96.88 | 6.3 | 14.5 |
| 1 | 684.4 | 515.6 | 16.7 | 77.3 |
| 2 | 203.1 | 196.9 | 6.3 | 29.5 |
| 3 | 684.4 | 715.6 | 16.7 | 100.2 |

As can be seen from Table 2, the maximum cell radius supported by the current LTE system is 100.2 km. Accordingly, in order to perform in-band operation using an LTE network, the UE for NB-IoT needs to support at least the same level of cell radius.

Figure 7:
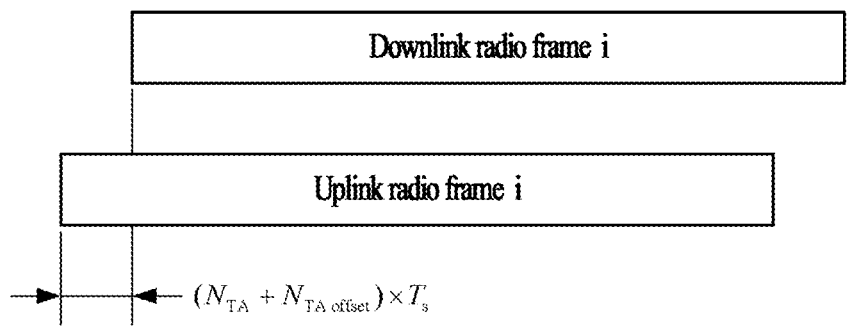
FIG. 7 illustrates an uplink-downlink timing relation.

FIG. 7 illustrates an uplink-downlink timing relation.

For uplink orthogonal transmission and reception, the base station may need to manage or adjust uplink transmission timing of each UE individually. Management or adjustment of transmission timing performed by the base station may be referred to as timing advance or timing alignment.

Timing advance or timing alignment may be performed through a random access procedure as described above. During the random access procedure, the base station may receive a random access preamble from the UE and calculate a timing advance value using the received random access preamble. The calculated timing advance value may be transmitted to the UE through a random access response, and the UE may update the signal transmission timing based on the received timing advance value. Alternatively, the base station may receive an uplink reference signal (e.g., a sounding reference signal (SRS)) that is periodically or randomly transmitted from the UE and calculate a timing advance, and the UE may update the signal transmission timing based on the calculated timing advance value.

As described above, the base station may measure the timing advance of the UE through a random access preamble or an uplink reference signal and may inform the UE of an adjustment value for timing alignment. In this case, the adjustment value for timing alignment may be referred to as a timing advance command (TAC) or a timing advance (TA) value.

Referring to FIG. 7, the transmission of uplink radio frame i from a UE may start $(N_{TA}+N_{TAoffset}) \times T_s$ seconds before the corresponding downlink radio frame starts, where $N_{TA}$ may be $0 \leq N_{TA} \leq 20512$, and $N_{TAoffset}$ may be 0 ($N_{TAoffset}=0$) for an FDD frame structure and 624 ($N_{TAoffset}=624$) for a TDD frame structure. $N_{TA}$ may be indicated by a TAC. $T_s$ denotes a sampling time. The uplink transmission timing may be adjusted in units of multiples of $16 T_s$. The TAC may be given in 11 bits in the random access response and may indicate a value from 0 to 1282. $N_{TA}$ may be given as TA*16. Alternatively, the TAC may be given in 6 bits and indicate a value from 0 to 63. In this case, $N_{TA}$ may be given as $N_{TA,old}+(TA-31)*16$. The TAC received in subframe n may be applied to subframes, starting in subframe n+6.

As described above, the conventional NB-IoT system is designed based on the GSM EDGE Radio Access Network (GERAN), which supports a cell radius of 35 km, and thus the cyclic prefix (CP) of the random access preamble is designed to support only cell radius of about 40 km. However, in order to support in-band operation in the LTE network, which is one of typical deployment scenarios of the NB-IoT system, it is necessary to support a cell radius of up to 100 km. In addition, the NB-IoT system includes a mobile autonomous reporting system at a place where humans are rare, that is, where the LTE network is not well equipped, and thus it is desirable to extend the supportable cell radius.

In order to extend the maximum supportable cell radius of the random access preamble, the CP of the (NPRACH) preamble may be extended. For example, the minimum duration of the CP for supporting a cell radius of 100 km may be calculated as in Equation 8 based on Equation 6.

$$\text{CP duration (us)} = 200 \text{ km}/(3E8 \text{ m/s}) = 666.7 \text{ us} \qquad \text{[Equation 8]}$$

A CP extended to support the extended cell radius as described above is referred to as an extended CP (E-CP). Additionally, the duration of the E-CP may be designed to have some margin in consideration of delay spread. In this case, a time gap having the same duration (e.g., 666.7 us) as the E-CP may be needed to avoid a case where the random access preamble received from the UE overlaps with the next adjacent subframe from the base station perspective. This time gap is referred to as a guard time (GT).

Both the CP and the GT have been added to avoid interference between symbols. In other words, since the CP and the GT are additional signals added in terms of performance, they may be classified as overhead in terms of system throughput. Therefore, to ensure more efficient preamble transmission, it may be considered to reduce the percentage overhead (% overhead) of the CP and increase a portion (e.g., symbols or symbol group portion) corresponding to the preamble information except the CP and the GT.

In addition, in order to support the cell radius extension, a timing estimation ambiguity for timing advance (TA) operation in addition to CP extension needs to be addressed. As described with reference to FIG. 7, it is necessary for a base station to individually control uplink transmission timing of each UE for uplink orthogonal transmission and reception. This process is referred to as timing advance (TA) or timing alignment. Initial timing advance is performed through a random access procedure. In the NB-IoT system, when the UE transmits a random access preamble, the base station estimates an uplink transmission delay from the received preamble and transmits the uplink transmission delay to the UE through a random access response (RAR) message in the form of a timing advance command. The UE adjusts the transmission timing using the TA command received through the RAR message.

As described with reference to FIG. 6, the random access preamble (or NPRACH preamble) for NB-IoT is transmitted in a manner of single carrier frequency hopping, and is designed considering both the timing estimation acquisition range and accuracy. The subcarrier spacing of the conventional random access preamble (or NPRACH preamble) is designed to enable timing estimation without ambiguity within a cell radius of 40 km at 3.75 kHz. When timing estimation is to be performed using the spacing between two subcarriers, a supportable cell radius without ambiguity may be calculated as follows. In estimation using the spacing between two subcarriers, the phase difference between the signals transmitted on the two subcarriers may be represented as 2*pi*delta_f, and delta_f represents the subcarrier spacing in Hz (Hertz). In addition, a phase difference between the signals transmitted on two subcarriers in consideration of a round trip delay may be represented as 2*pi*delta_f*tau_RTT, where tau_RTT denotes the round trip delay. In order for the phase difference and the cell radius to have values satisfying a one-to-one correspondence relationship, 2*pi*delta_f*tau_RTT<2*pi should be satisfied. Thus, to ensure estimation without ambiguity, the relationship of tau_RTT<1/delta_f should be satisfied. The round trip distance is tau_RTT*(light speed)/2, where light speed=3E8 m/s. Accordingly, when the subcarrier spacing is 3.75 kHz, the cell radius is 1/delta_f*3E8/2=1/3.75 (kHz) *3E8 (m/s)/2=40 km. Since the cell radius within which timing estimation without ambiguity is allowed at 3.75 kHz subcarrier spacing of the legacy random access preamble (or NPRACH preamble) is 40 km, the subcarrier spacing should be narrowed to 1.5 kHz or less to support the cell radius of 100 km. Alternatively, the issue of timing estimation ambiguity may be addressed by applying fractional frequency hopping while maintaining the subcarrier spacing at 3.75 kHz, which is the same as the legacy preamble.

In brief, the cyclic prefix of the random access preamble should be extended to at least 666.7 us in order to support a cell radius of 100 km. The subcarrier spacing of the random access preamble should be narrowed to 1.5 kHz or less in order to perform timing estimation without ambiguity. Alternatively, timing estimation ambiguity should be resolved by applying fractional frequency hopping while maintaining the subcarrier spacing of 3.75 kHz.

The present disclosure is intended to enable the NB-IoT system to be used on the LTE network or a network supporting the maximum cell radius of the LTE system. Specifically, proposed herein is a method for resource allocation and frequency hopping for NB-IoT NPRACH.

For simplicity, the random access preamble supporting the extended cell radius (e.g., 100 km) as proposed in the present disclosure is defined as an "enhanced" preamble, and the conventional random access preamble is referred to as a "legacy" preamble. In the present specification, the legacy preamble may be referred to as a first preamble format, and the enhanced preamble may be referred to as a second preamble format. In the present disclosure, the terms "random access preamble," "(N)PRACH preamble," "(N) PRACH signal" and "(N)PRACH" may be used interchangeably and may be referred to simply as a preamble. In the present disclosure, the terms "PRACH symbol group" and "random access symbol group" may be used interchangeably and may be referred to simply as a symbol group. In addition, a UE supporting the conventional NB-IoT (or the legacy preamble) may be referred to as a legacy UE, and a UE supporting the enhanced preamble (or both the legacy preamble and the enhanced preamble) may be referred to as an enhanced UE.

The present disclosure is described based on a UE/base station/system supporting NB-IoT, but the present disclosure is not limited thereto. The present disclosure may be also applied to a UE/base station/system that does not support NB-IoT communication in the same manner. For example, the present disclosure may be applied not only to UEs/base stations/systems supporting massive machine type communication (mMTC) but also to typical UEs/base stations/ systems (e.g., LTE/LTE-A/LTE-A Pro/5G systems and UEs/ base stations operable in the systems). In the present specification, a UE/base station/system may collectively refer to a UE/base station/system supporting NB-IoT and a typical UE/base station/system not supporting NB-IoT.

Enhanced Preamble Format

In this specification, the enhanced preamble refers to a preamble designed to support a larger cell radius than the legacy preamble for NPRACH range enhancement by increasing the CP duration such that the preamble corresponds to a plurality of symbols compared to the conventional preamble, narrowing the subcarrier spacing to 3.75/N kHz (where N is an integer greater than 1), or the like. The enhanced preamble may be a new type of PRACH format added to the existing legacy preamble.

Figure 8:
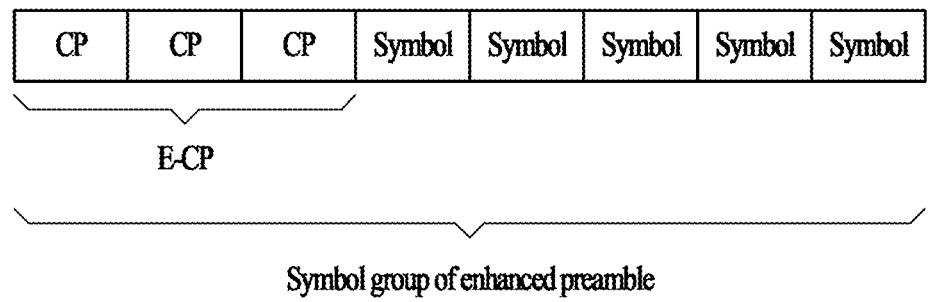
FIG. 8 illustrates an enhanced preamble according to the present disclosure.

As an example of the enhanced preamble, the number of symbols used for the CP may be increased within a symbol group constituting a random access preamble (or NPRACH preamble) for conventional NB-IoT (e.g., see FIG. 6 and related description). In the present disclosure, a CP corresponding to a plurality of symbols in a symbol group is referred to as an enhanced CP (E-CP). For example, to support an E-CP (>666.7 us), the first three symbols of the six symbols of the legacy preamble may be used as a CP and the five symbols may be used as a sequence part (e.g., see FIG. 8). In this example, the UE transmits a random access preamble in a format including a CP part corresponding to a 5-symbol duration and a sequence part corresponding to a 3-symbol duration, and the base station considers the first three symbols as an enhanced CP (E-CP), and performs preamble detection and timing estimation using the remaining five symbols other than the first three symbols. The random access preamble format of FIG. 8 is merely an example, and the present disclosure is not limited to the random access preamble format of FIG. 8.

As another example of the enhanced preamble, to support a cell radius of 100 km without ambiguity in timing estimation, the subcarrier spacing of the random access preamble (or NPRACH preamble) may be narrowed to 1.5 kHz or less. For example, the subcarrier spacing of the enhanced preamble may be set to 3.75/N kHz (where N is an integer greater than 3), taking into account additional delay spread and interference during FDM. More specifically, the subcarrier spacing may be set to 1.25 kHz (with N=3) to support up to the cell radius of 120 km. As such, by using a small subcarrier spacing for random access preamble (or NPRACH preamble) transmission, range enhancement may be achieved without ambiguity of timing estimation.

NPRACH Resource Allocation and Hopping

In a system where the legacy preamble and the enhanced preamble coexist, the NPRACH resource of the legacy preamble may be shared or the same NPRACH resource configuration method as the legacy preamble may be used in transmitting the enhanced preamble in order to ensure efficient utilization of NPRACH time/frequency resources and/or backward compatibility. To this end, the duration of the enhanced preamble (in the time domain) may be designed to be the same as the duration of the legacy preamble. Such an operation is referred to as preamble boundary alignment of the legacy preamble and the enhanced preamble.

The number of symbols per symbol group and/or symbol groups per preamble may be adjusted for preamble boundary alignment. For example, in the case of the legacy preamble, since one preamble consists of four symbol groups and one symbol group consists of six symbols (e.g., see FIG. 6), the number of symbols per preamble is 4*6=24. On the other hand, in the enhanced preamble, for example, when 8 symbols constitute one symbol group (e.g., see FIG. 8), the number of symbols per preamble is 8*4=32 (i.e., symbols per preamble=8 symbols/symbol group*4 symbol groups/ preamble=32 symbols/preamble). In this example, when the number of symbol groups per preamble of the enhanced preamble is adjusted to 3, the number of symbols per preamble of the enhanced preamble is 8*3=24 (i.e., symbols per preamble=8 symbols/symbol group*3 symbol groups/ preamble=24 symbols/preamble). Therefore, in this example, preamble boundary alignment with the legacy preamble may be achieved by adjusting the number of symbol groups constituting the enhanced preamble to 3.

In addition to or independently of the preamble boundary alignment, symbol group boundary alignment may be considered. For a fractional frequency hopping-based enhanced preamble, the subcarrier spacing is 3.75 kHz, which is the same as the subcarrier spacing of the legacy preamble, and accordingly the symbol group boundary alignment may be achieved by configuring one symbol group with six symbols. For an enhanced preamble based on a subcarrier of 1.25 kHz, the duration of one symbol is three times that of the legacy preamble. Accordingly, when a symbol group is composed of two symbols in the enhanced preamble, symbol group boundary alignment with the legacy preamble may be established.

In addition to or independently of the above-described preamble boundary alignment and/or symbol group boundary alignment, a method of sharing an NPRACH resource in an FDM manner may be considered. More specifically, in an FDM-based NPRACH resource sharing method, a part of the NPRACH frequency resource may be allocated to the legacy preamble and the remaining part thereof may be allocated to the enhanced preamble, such that the enhanced preamble and the legacy preamble may coexist in a legacy NPRACH resource configuration region without affecting the operation of the legacy UE.

Based on this, NPRACH resource allocation and frequency hopping methods for the enhanced preamble are proposed in the present disclosure. For simplicity, in one preamble, the first symbol group is referred to as symbol group 0 or a first symbol group, the second symbol group is referred to as symbol group 1 or a second symbol group, the third symbol group is referred to as symbol group 2 or a third symbol group, and the fourth symbol group is referred to as symbol group 3 or a fourth symbol group.

Method 1-1 for NPRACH Resource Allocation and Frequency Hopping

In Method 1-1 of the present disclosure, a method for the legacy preamble is changed to the minimum degree and applied to the enhanced preamble. Specifically, according to Method 1-1 of the present disclosure, subcarrier index information (e.g., $\tilde{n}_{SC}^{RA}(i)$, where i=0) for symbol group 0 of the preamble may be determined based on a value selected by a higher layer (e.g., a MAC layer) (see, for example, Equations 3 and 4), and subcarrier index information (e.g., $\tilde{n}_{SC}^{RA}(i)$ where i=1) for symbol group 1 of the preamble may be determined by adding or subtracting 1/N to or from the subcarrier index information for symbol group 0 depending on whether the subcarrier index information for symbol group 0 is an odd number or an even number. Subcarrier index information (e.g., $\tilde{n}_{SC}^{RA}(i)$, where i=2) for symbol group 2 of the preamble may be determined by applying 6 to the subcarrier index information for symbol group 1, and subcarrier index information (e.g., $\tilde{n}_{SC}^{RA}(i)$, where i=3) for symbol group 3 of the preamble may be determined by adding or subtracting 1/N to or from the subcarrier index information for symbol group 2 depending on whether the subcarrier index information for symbol group 2 is an odd number or an even number. The frequency position of each symbol group may be determined by adding a start subcarrier index (e.g., $n_{start}$) to the corresponding subcarrier index information (e.g., $\tilde{n}_{SC}^{RA}(i)$ (see, for example, Equation 1). The remaining NPRACH configuration information may be given as described with reference to FIG. 6.

Method 1-1 of the present disclosure assumes that the minimum frequency hopping distance is 3.75 kHz/N. N may be referred to as a ratio of a minimum frequency hopping distance or subcarrier spacing between a legacy preamble and an enhanced preamble. N may be set to an integer greater than 1. As described above, when N is greater than or equal to 3, timing estimation for accurate TA command generation may be performed without ambiguity.

Method 1-1 of the present disclosure may be implemented by Equation 9. As may be seen from Equation 9, 1/N is applied in obtaining the subcarrier index information for symbol groups 1 and 3. Specifically, when the subcarrier index information for symbol group 0 or 2 is an even number (i.e., the value of modulo-2 is 0), the subcarrier index information for symbol group 1 or 3 may be determined by adding 1/N to the subcarrier index information for symbol group 0 or 2. When the subcarrier index information for symbol group 0 or 2 is an odd number (i.e., the value of modulo-2 is 1), the subcarrier index information for symbol group 1 or 3 may be determined by subtracting 1/N from the subcarrier index information for symbol group 0 or 2.

$$\tilde{n}_{sc}^{RA}(i) = \qquad\qquad\qquad\qquad\qquad\qquad\qquad\text{[Equation 9]}$$

$$\begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1/N & \begin{array}{l} i \bmod 4 = 1,3 \text{ and} \\ \lfloor \tilde{n}_{sc}^{RA}(i-1) \rfloor \bmod 2 = 0 \end{array} \\ \tilde{n}_{sc}^{RA}(i-1) - 1/N & \begin{array}{l} i \bmod 4 = 1,3 \text{ and} \\ \lfloor \tilde{n}_{sc}^{RA}(i-1) \rfloor \bmod 2 = 1 \end{array} \\ \tilde{n}_{sc}^{RA}(i-1) + 6 & \begin{array}{l} i \bmod 4 = 2 \text{ and} \\ \tilde{n}_{sc}^{RA}(i-1) < 6 \end{array} \\ \tilde{n}_{sc}^{RA}(i-1) - 6 & \begin{array}{l} i \bmod 4 = 2 \text{ and} \\ \tilde{n}_{sc}^{RA}(i-1) \geq 6 \end{array} \end{cases}$$

$$f(t) = \left( f(t-1) + \left( \sum_{n=10t+1}^{10t+9} c(n)2^{n-(10t+1)} \right) \bmod(N_{sc}^{RA} - 1) + 1 \right)$$

$$\bmod N_{sc}^{RA}$$

$$f(-1) = 0$$

Figure 9:
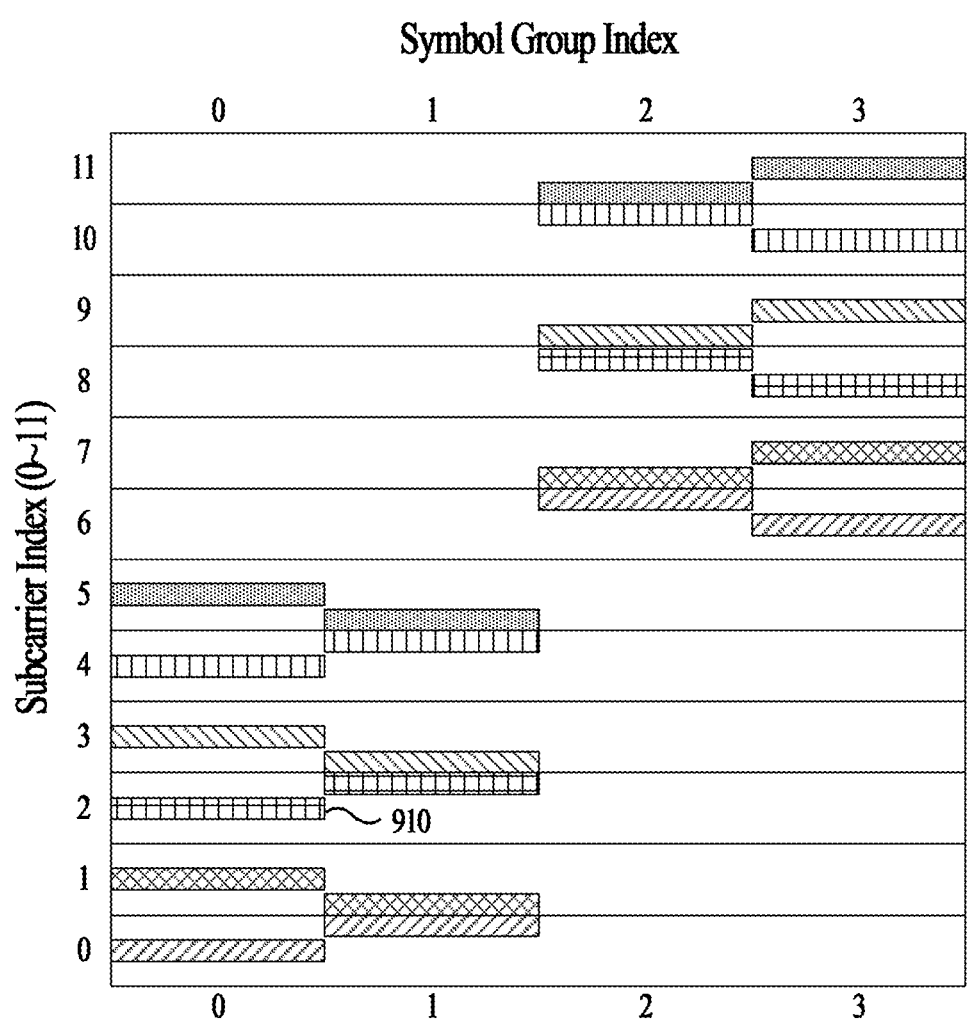

FIG. 9 illustrates an NPRACH resource allocation and frequency hopping method according to Method 1-1 of the present disclosure. While it is assumed in FIG. 9 that N=3 (e.g., subcarrier spacing=1.25 kHz), the present disclosure may be applied even to a case where N is not 3, in the same/similar manner. While it is assumed in FIG. 9 that the start subcarrier index (e.g., $n_{start}$) is 0, the present disclosure may be applied even in the case where the start subcarrier index is not 0, in the same/similar manner. In this case, the actual frequency position may be estimated by adding the start subcarrier index to the corresponding subcarrier index.

A basic unit of preamble repetition is illustrated in FIG. 9. The basic unit of preamble repetition consists of 12 subcarriers and 4 symbol groups based on subcarrier spacing of 3.75 kHz. A symbol group is composed of multiple symbols. The number of symbols constituting the symbol group may depend on the subcarrier spacing of the configured symbols. In addition, in FIG. 9, it is assumed that the symbols in the symbol group are single tones having the same center frequency. In addition, in FIG. 9, preambles are represented by different patterns to distinguish between different preambles.

For example, symbol group 0 of a preamble 910 is transmitted at (the center frequency of) subcarrier index 2, and symbol group 1 is subjected to fractional frequency hopping by +⅓. Subcarrier spacing is subjected to integer frequency hopping by +6 at symbol index 2, and then fractional frequency hopping is performed by −⅓ at symbol index 3. While only subcarrier indexes 0 to 5 are shown in a preamble hopping pattern starting at symbol index 0 for simplicity, it may be seen that the operation is performed for the other upper subcarrier indexes 6 to 11 in the form of a mirror image of the pattern exemplarily shown in FIG. 9.

Method 1-2 for NPRACH Resource Allocation and Frequency Hopping

As may be seen from the pattern of FIG. 9, with Method 1-1 of the present disclosure, the minimum frequency separation between different preambles in symbol groups 1 and 2 is narrower than in the case of symbol groups 0 and 3. For example, when 1/N (e.g., N=3) is applied as in FIG. 9, the spacing between different preambles is 3.75 kHz in symbol groups 0 and 3, whereas the spacing between different preambles is 2 in symbol groups 1 and 2 is narrowed from 3.75 kHz to 1.25 kHz. Therefore, according to Method 1-1 of the present disclosure, the operation may become vulnerable to the interference between preambles.

Method 1-2 of the present disclosure allows the minimum frequency separation between different preambles to be constant. Specifically, Method 1-2 of the present disclosure is different from Method 1-1 of the present disclosure in that subcarrier index information (e.g., $\tilde{n}_{SC}^{RA}(i)$, where i=1) for symbol group 1 of the preamble is determined by adding 1/N to subcarrier index information for symbol group 0, and subcarrier index information (e.g., $\tilde{n}_{SC}^{RA}(i)$ where i=3) for symbol group 3 of the preamble is determined by subtracting 1/N from subcarrier index information for symbol group 2. More specifically, in Method 1-2 of the present disclosure, regardless of whether the subcarrier index information for the previous symbol group (symbol group 0, 2) is an odd number or an even number, the subcarrier index information (e.g., $\tilde{n}_{SC}^{RA}(i)$, where i=1) for symbol group 1 is determined by adding 1/N to the subcarrier index information for symbol group 0, and the subcarrier index information (e.g., $\tilde{n}_{SC}^{RA}(z)$, where i=3) for symbol group 3 is determined by subtracting 1/N from the subcarrier index information for symbol group 2. The frequency position of each symbol group may be determined by adding a start subcarrier index (e.g., $n_{start}$) to the corresponding subcarrier index information (e.g., $\tilde{n}_{SC}^{RA}(i)$) (see, for example, Equation 1). The remaining NPRACH configuration information may be given as described with reference to FIG. 6.

According to Method 1-2 of the present disclosure, the minimum frequency separation between different preambles remains constant at 3.75 kHz. Accordingly, the method has an advantage over Method 1-1 of the present disclosure in terms of interference between different preambles.

Method 1-2 of the present disclosure assumes that the minimum frequency hopping distance is 3.75 kHz/N. N may be referred to as a ratio of a minimum frequency hopping distance or subcarrier spacing between a legacy preamble and an enhanced preamble. N may be set to an integer greater than 1. As described above, when N is greater than or equal to 3, timing estimation for accurate TA command generation may be performed without ambiguity.

Method 1-2 of the present disclosure may be implemented by Equation 10. As may be seen from Equation 10, subcarrier index information for symbol groups 1 and 3 (i=1, 3) is obtained differently from Equation 9, and subcarrier index information for symbol groups 0 and 2 (i=0, 2) is obtained in the same manner as in Equation 9.

$$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1/N & i \bmod 4 = 1 \\ \tilde{n}_{sc}^{RA}(i-1) - 1/N & i \bmod 4 = 3 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$ [Equation 10]

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

Figure 10:
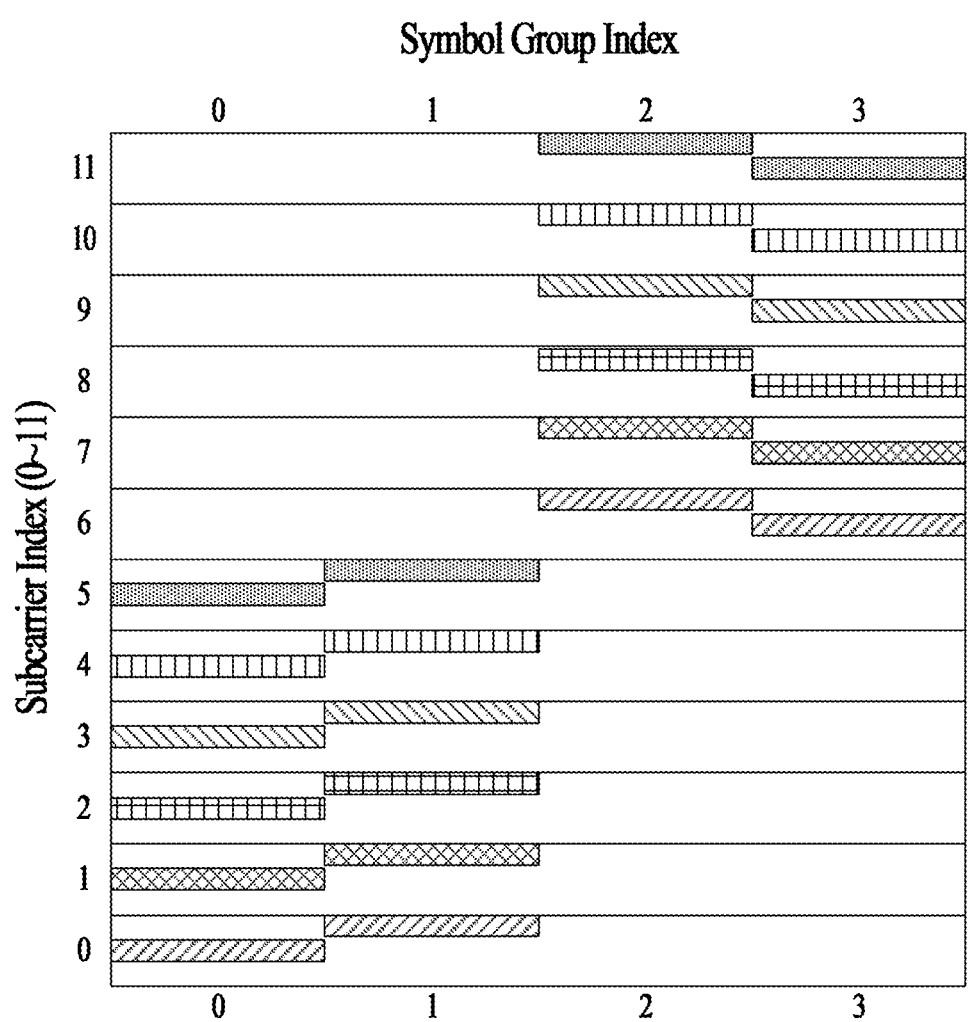

FIG. 10 illustrates an NPRACH resource allocation and frequency hopping method according to Method 1-2 of the present disclosure. While it is assumed in FIG. 10 that N=3 (e.g., subcarrier spacing=1.25 kHz), the present disclosure may be applied even to a case where N is not 3, in the same/similar manner. While it is assumed in FIG. 10 that the start subcarrier index (e.g., $n_{start}$) is 0, the present disclosure may be applied even in the case where the start subcarrier index is not 0, in the same/similar manner. In this case, the actual frequency position may be estimated by adding the start subcarrier index to the corresponding subcarrier index.

In contrast to FIG. 9, in the preamble pattern of FIG. 10, a minimum frequency separation between different preambles may be given as a constant of 3.75 kHz. For example, in FIG. 9, the spacing between symbol groups 0 and 3 at subcarrier indexes 0 and 1 is 3.75 kHz, and the spacing between symbol groups 1 and 2 is narrowed to 1.25 kHz. On the other hand, in FIG. 10, the spacing between symbol groups is maintained at 3.75 kHz. Thus, Method 1-2 of the present disclosure has an advantage in terms of interference between different preambles.

A basic unit of preamble repetition is illustrated in FIG. 10, and preambles are represented by different patterns to distinguish between different preambles. While only subcarrier indexes 0 to 5 are shown in a preamble hopping pattern starting at symbol index 0 for simplicity, it may be seen that the same operation is performed for the remaining upper subcarrier indexes 6 to 11.

The enhanced preamble according to Method 1-1 or Method 1-2 of the present disclosure may operate in a manner of frequency division multiplexing (FDM) with a legacy preamble. FDM refers to a method by which the legacy preamble and the enhanced preamble are classified into consecutive different frequency regions and operated so as not to infringe on each other.

Method 1-3 for NPRACH Resource Allocation and Frequency Hopping

The FDM method of classifying the preambles into the consecutive frequency regions is a method of dividing NPRACH resources. To ensure more efficient coexistence of the enhanced preamble and the legacy preamble, a method of operating the enhanced preamble and the legacy preamble in the same frequency region (e.g., the same subcarrier) may be considered. When the enhanced preamble and the legacy preamble are operated in the same frequency region, symbol groups 0 and 3 of the legacy preamble may be transmitted at the center frequency of each subcarrier, and symbol groups 0 and 3 of the enhanced preamble may also be transmitted at the same center frequency. As a result, a collision may occur between the legacy preamble and the enhanced preamble. Therefore, when Method 1-1 and Method 1-2 of the present disclosure are operated in the same frequency region (e.g., the same subcarrier) as that of the legacy preamble, performance degradation due to mutual interference is expected to occur because the enhanced preamble and the legacy preamble may collide with each other. Method 1-3 of the present disclosure is intended to address this technical issue.

Method 1-3 of the present disclosure is to more efficiently operate NPRACH resources in a system in which an enhanced preamble and a legacy preamble are operated simultaneously by positioning the enhanced preamble at a boundary portion of subcarrier spacing of the legacy preamble such that mutual interference is minimized.

Figure 11:
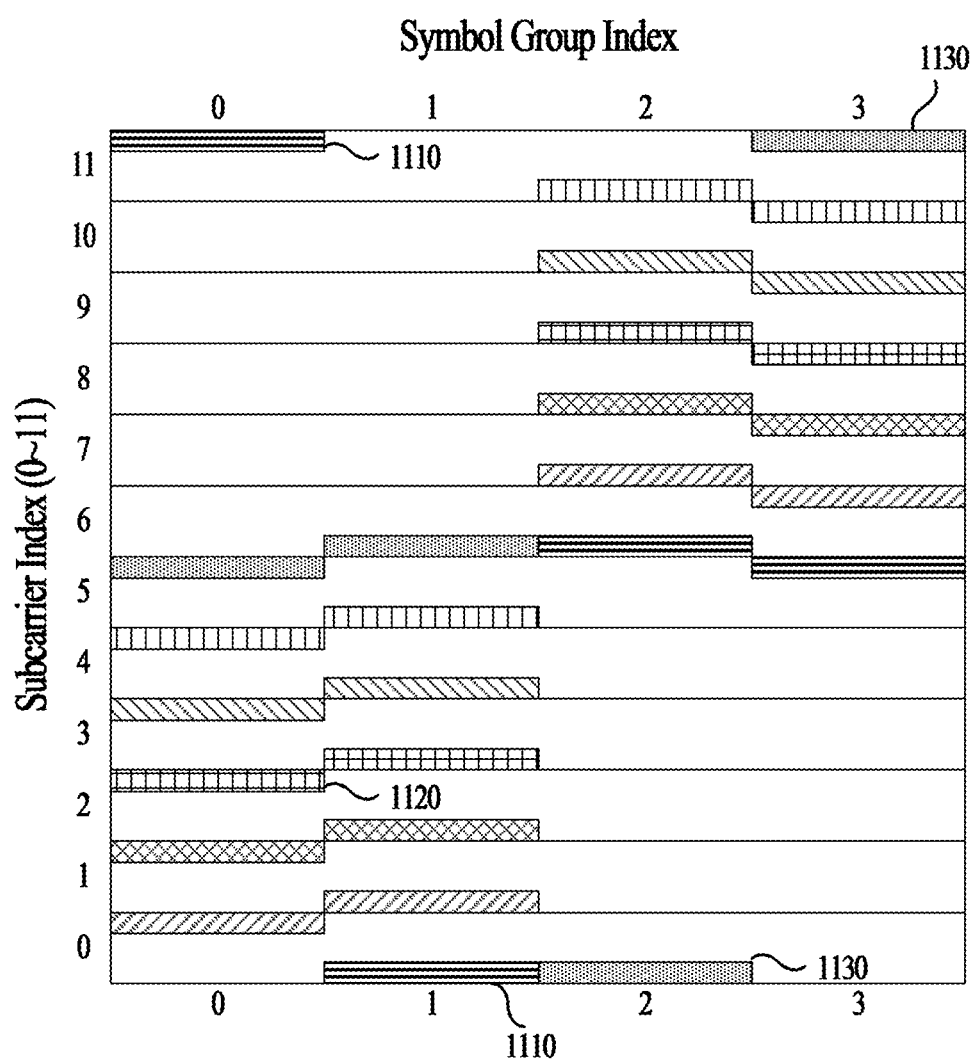

FIG. 11 illustrates an NPRACH resource allocation and frequency hopping method according to Method 1-3 of the present disclosure. While it is assumed in FIG. 11 that N=3 (e.g., subcarrier spacing=1.25 kHz), the present disclosure may be applied even to a case where N is not 3, in the same/similar manner. While it is assumed in FIG. 11 that the start subcarrier index (e.g., $n_{start}$) is 0, the present disclosure may be applied even in the case where the start subcarrier index is not 0, in the same/similar manner. In this case, the actual frequency position may be estimated by adding the start subcarrier index to the corresponding subcarrier index. In addition, a basic unit of preamble repetition is illustrated in FIG. 11, and preambles are represented by different patterns to distinguish between different preambles. While only subcarrier indexes 0 to 5 and 11 are shown in a preamble hopping pattern starting at symbol index 0 for simplicity, it may be seen that the same operation is performed for the remaining upper subcarrier indexes 6 to 10.

As described with reference to FIGS. 9 and 10, in Method 1-1 and Method 1-2 of the present disclosure, symbol group 0 of the preamble is mapped to the center frequency of each subcarrier so as to be transmitted, and thus interference with the legacy preamble may occur. In contrast, referring to FIG. 11, according to Method 1-3 of the present disclosure, symbol group 0 of the preamble is mapped to the boundary portion of each subcarrier so as to be transmitted, and therefore interference with the legacy preamble may be minimized.

According to Method 1-3 of the present disclosure, a subcarrier index may be determined beyond the frequency region allocated to the NPRACH. In the example of FIG. 11, symbol group 0 of a preamble 1110 is mapped to a boundary portion of subcarrier index 11, and the subcarrier index of symbol group 1 is determined by adding 1/N (where N=3, for example) thereto. Accordingly, mapping may be performed beyond the allocated frequency region. In Method 1-3 of the present disclosure, in order to prevent such an issue from being raised, a portion beyond the allocated frequency region is allocated to the opposite side of the allocated frequency region through modulo M operation. Here, M may be the number of subcarriers (e.g., $N_{SC}^{RA}$ or $N_{sc}^{NPRACH}$) allocated as an NPRACH resource region. The modulo M operation may be performed on a subcarrier index (e.g., $\tilde{n}_{SC}^{RA}(i)$) that is used for frequency hopping in the allocated frequency region.

Referring back to FIG. 11, applying modulo M to a subcarrier index for symbol group 1 of the preamble 1110 may map symbol group 1 of the preamble 1110 to the opposite side of the allocated frequency region. In a similar manner, applying modulo M to a subcarrier index for symbol group 2 of the preamble 1130 may map symbol group 2 of the preamble 1130 to the opposite side of the allocated frequency region.

For an enhanced preamble moved to the opposite side through modulo M at the boundary of the allocated frequency region, timing estimation may be performed differently by the receiver. For example, in the case of the preamble 1120, when the phases of symbol groups 0/1/2/3 are p0/p1/p2/p3, respectively, coarse timing estimation may be performed with a combination of phase difference information for p1 and p0 and phase difference information for p2 and p3, and fine timing estimation may be performed with phase difference information for p2 and p1 and phase difference information for p3 and p0. In contrast, in the case of the preamble 1110 for which modulo M is applied beyond the allocated NPRACH frequency region, coarse timing estimation may be performed only with a combination of phase difference information for p2 and p3 and fine timing estimation may be performed with phase difference information for p2 and p1 and phase difference information for p0 and p3. Then, phase difference information for p0 and p1 may be used for fine timing estimation. Thereby, accuracy of fine timing estimation can be improved. Similarly, in the case of the preamble 1130, coarse timing estimation may be performed only with a combination of phase difference information for p0 and p1 and fine timing estimation may be performed with phase difference information for p2 and p1 and phase difference information for p0 and p3. Then, phase difference information for p2 and p3 may be used for fine timing estimation. Thereby, accuracy of fine timing estimation can be improved.

Method 1-3-1 for NPRACH Resource Allocation and Frequency Hopping

In Method 1-3 of the present disclosure, in the case of the preamble 1110 or preamble 1130 to which modulo M is applied beyond the allocated NPRACH frequency region, coarse timing estimation may be performed only with a combination of a phase difference information for p2 and p3 or a combination of a phase difference information for p1 and p0. In this case, the coarse timing estimation performance may be lower than in the case of the preamble fully present in the allocated NPRACH frequency region in which both the phase difference information for p1 and p0 and the phase difference information for p2 and p3 are used. Method 1-3-1 of the present disclosure is a method for preventing selection of the preamble resource from causing a performance difference. In this method, a preamble (the preamble 1110 or preamble 1130) to which modulo M is applied beyond the allocated NPRACH frequency region is excluded from selectable NPRACH resources.

Figure 12:
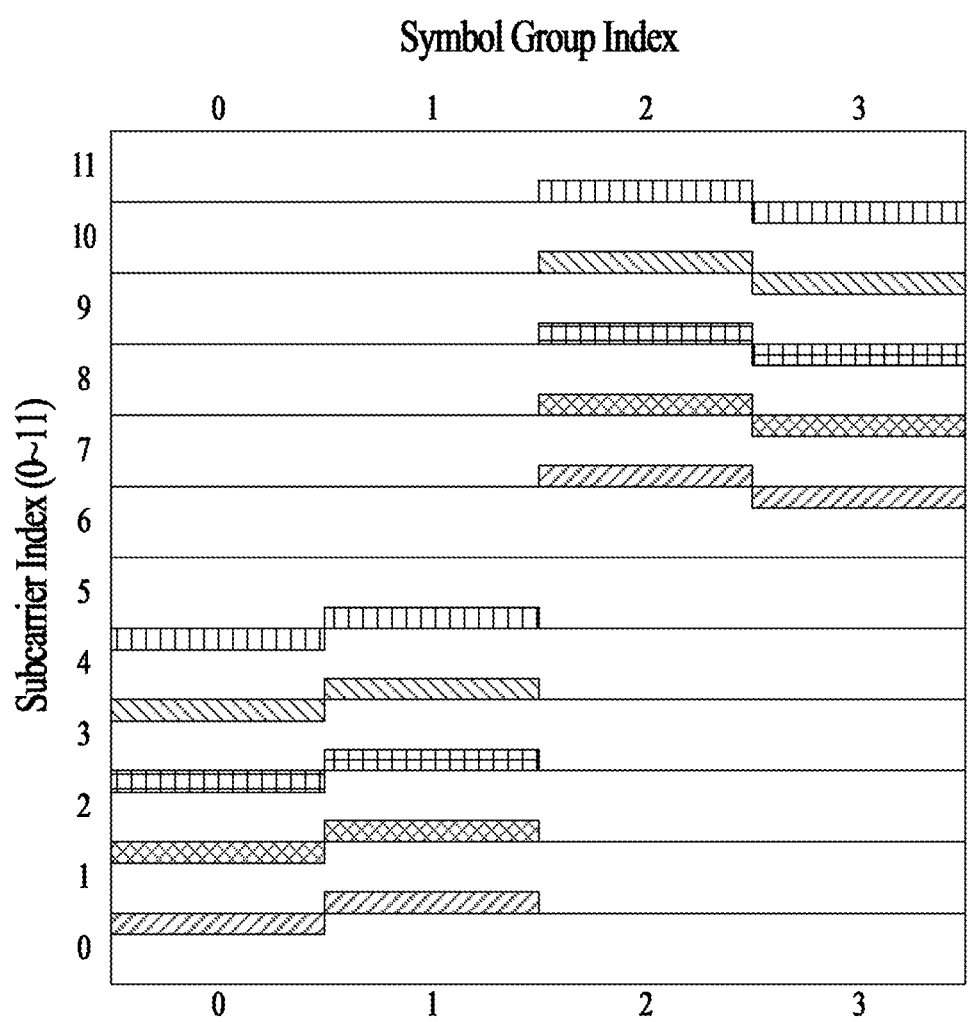

FIG. 12 illustrates an NPRACH resource allocation and frequency hopping method according to Method 1-3-1 of the present disclosure. In contrast to FIG. 11, the same assumption is applied to FIG. 12, but the subcarrier indexes for the preamble 1110 and the preamble 1130 are excluded from the available NPRACH resources, and the NPRACH preamble is not transmitted at the corresponding frequency.

Method 1-4 for NPRACH Resource Allocation and Frequency Hopping

The enhanced preamble may be designed to satisfy a minimum frequency hopping distance of 3.75/N kHz (e.g., N>=3) in order to address the issue of timing estimation ambiguity. Methods 1-1/1-2/1-3/1-3-1 of the present disclosure are applicable to the enhanced preamble designed in this manner. In order to use the limited NPRACH frequency resources more efficiently than in the proposed methods 1-1/1-2/1-3/1-3-1, the enhanced preamble may be allocated in units of 3.75/N kHz. As a method for allocating the enhanced preamble in units of 3.75/N kHz, fractional frequency hopping may be performed while maintaining the subcarrier spacing as 3.75 kHz or the subcarrier spacing may be reduced to 3.75/N kHz. In Methods 1-1/1-2/1-3/1-3-1 of the present disclosure, fractional frequency hopping is applied while maintaining the subcarrier spacing as 3.75 kHz. In Method 1-4 of the present disclosure, Method 1-1/1-2/1-3/1-3-1 is applied by reducing the subcarrier spacing to 3.75/N kHz.

Figure 13:
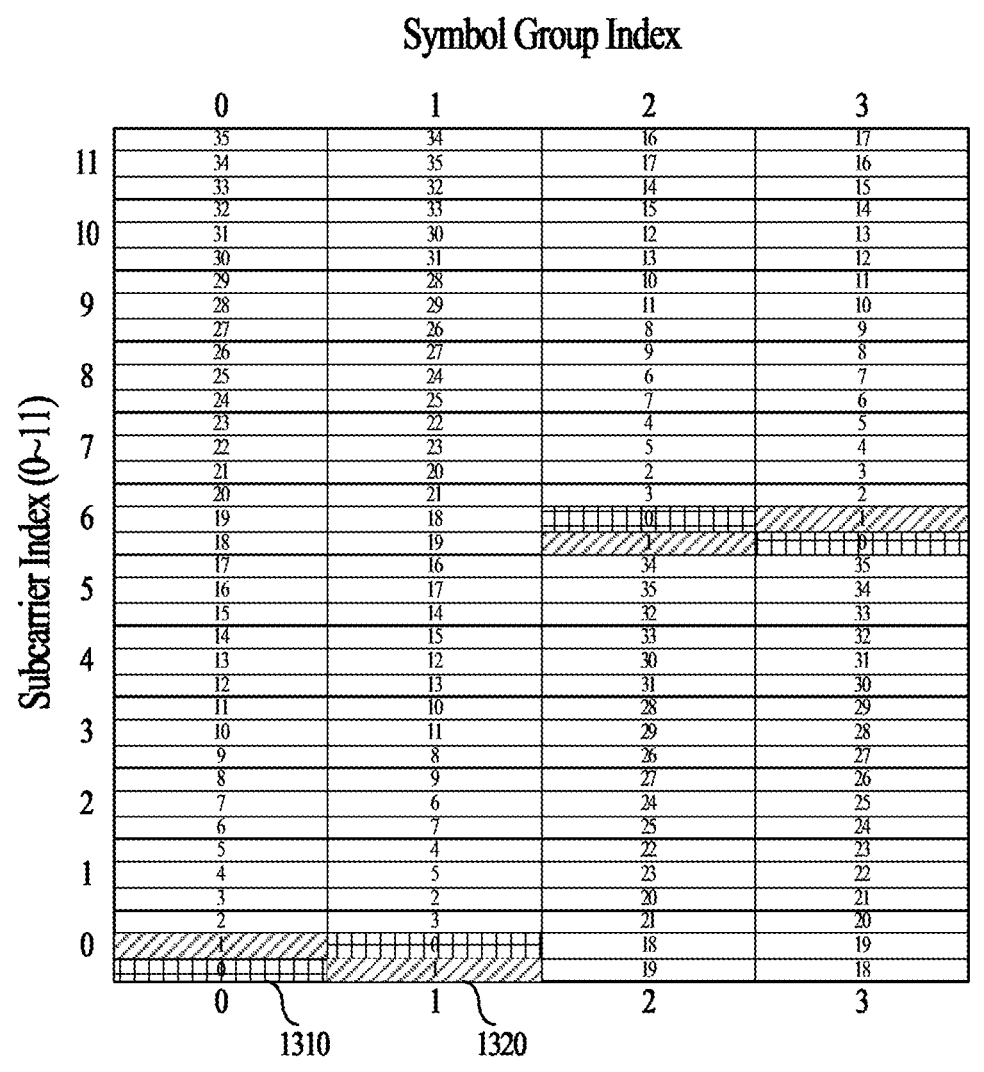

FIG. 13 illustrates an NPRACH resource allocation and frequency hopping method according to Method 1-4 of the present disclosure. While it is assumed in FIG. 13 that N=3, the present disclosure may be applied even to a case where N is not 3, in the same/similar manner.

Referring to FIG. 13, the vertical axis represents subcarrier indexes based on 3.75 kHz. In FIG. 13, there are 12*3=36 subcarriers based on a subcarrier of 1.25 kHz, assuming N=3. Thus, with Method 1-4, the number of frequency resources for NPRACH transmission, which is 12 in conventional cases, is increased by N times from 12 to 12*N. FIG. 13 exemplarily shows frequency hopping patterns for 0 to 35. The figure exemplarily shows frequency hopping patterns of two preambles 1310 and 1320. Similar to Methods 1-1/1-2/1-3/1-3-1 of the present disclosure, Method 1-4 of the present disclosure ensures a minimum frequency hopping distance of 3.75/N kHz (e.g., a frequency hopping distance between symbol groups 0 and 1 and a frequency hopping distance between symbol groups 2 and 3), and provides hopping of 6 subcarrier spacings (e.g., a frequency hopping distance between symbol groups 1 and 2) based on a subcarrier of 3.75 kHz.

When the NPRACH resource defined in units of 3.75/N kHz in Method 1-4 is defined as an enhanced NPRACH resource, the enhanced preamble may be positioned at a boundary portion of the subcarrier spacing of the legacy preamble even in the enhanced NPRACH resource for the same purpose as Methods 1-3/1-3-1.

Figure 14:
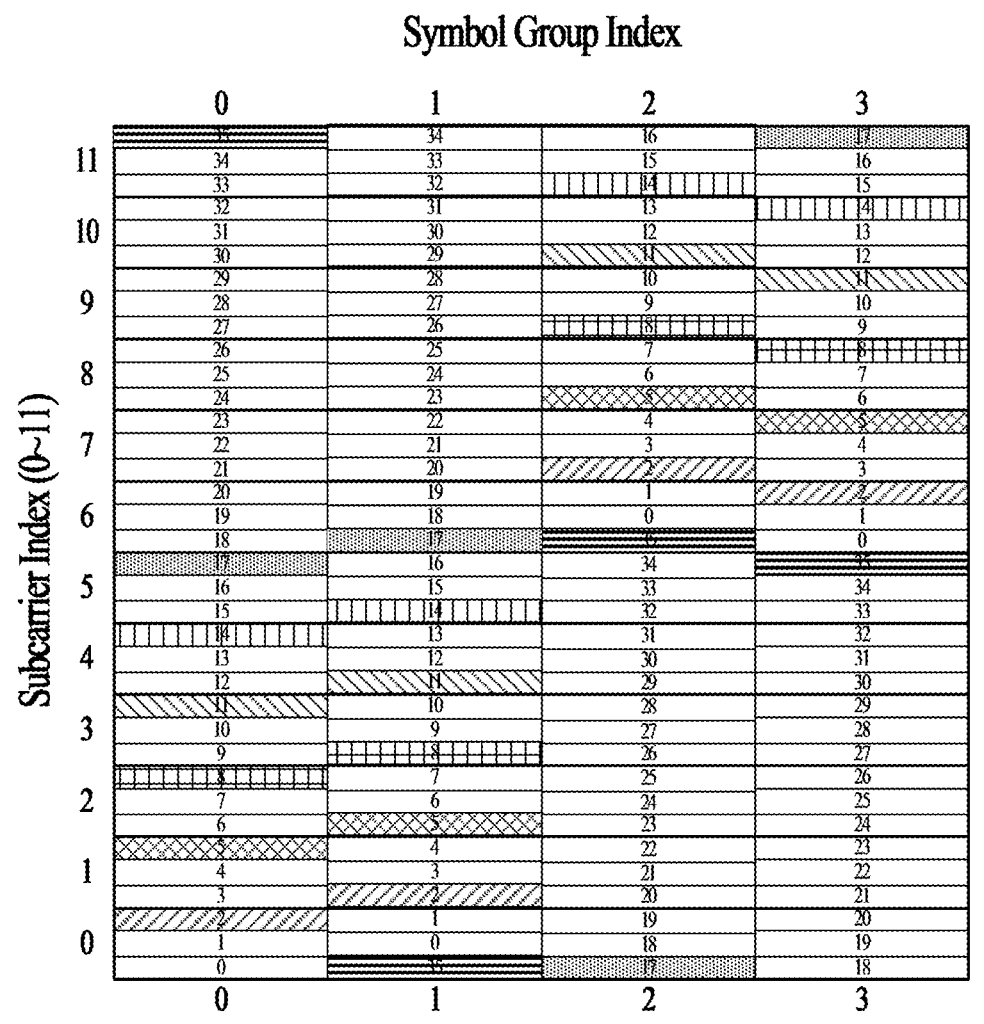

FIG. 14 illustrates Method 1-4 of the present disclosure applied based on Method 1-3 of the present disclosure.

Method 1-4 of the present disclosure is used to extend the multiplexing capability of the enhanced preamble using an enhanced NPRACH resource, or may be used to minimize mutual interference with the legacy preamble and increase the efficiency in the case of coexistence of the enhanced preamble and the legacy preamble as illustrated in FIG. 14. Alternatively, the regions may be divided into an FDM manner, such that some time/frequency regions are used to increase efficiency of coexistence with the legacy preamble by applying a method as illustrated in FIG. 14, and some other time/frequency regions are used to extend NPRACH resources of an enhanced UE.

Figure 15:
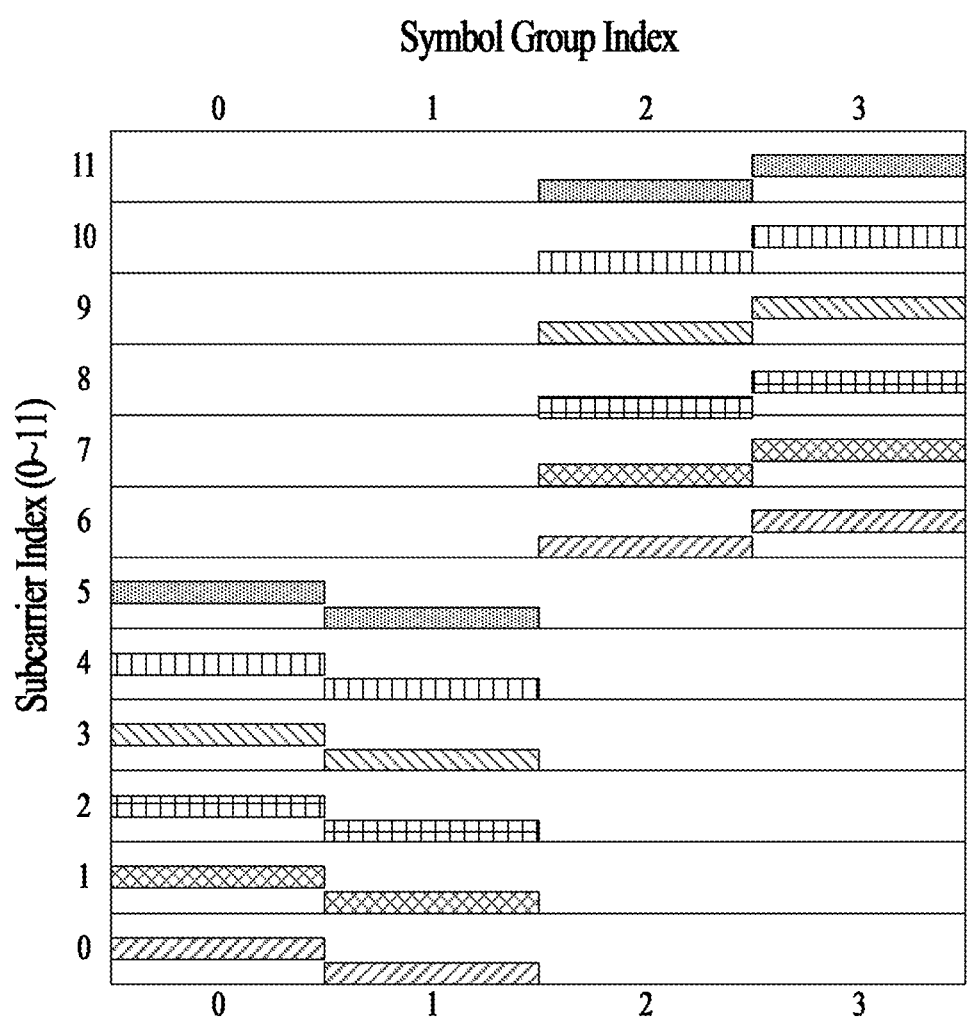
Figure 16:
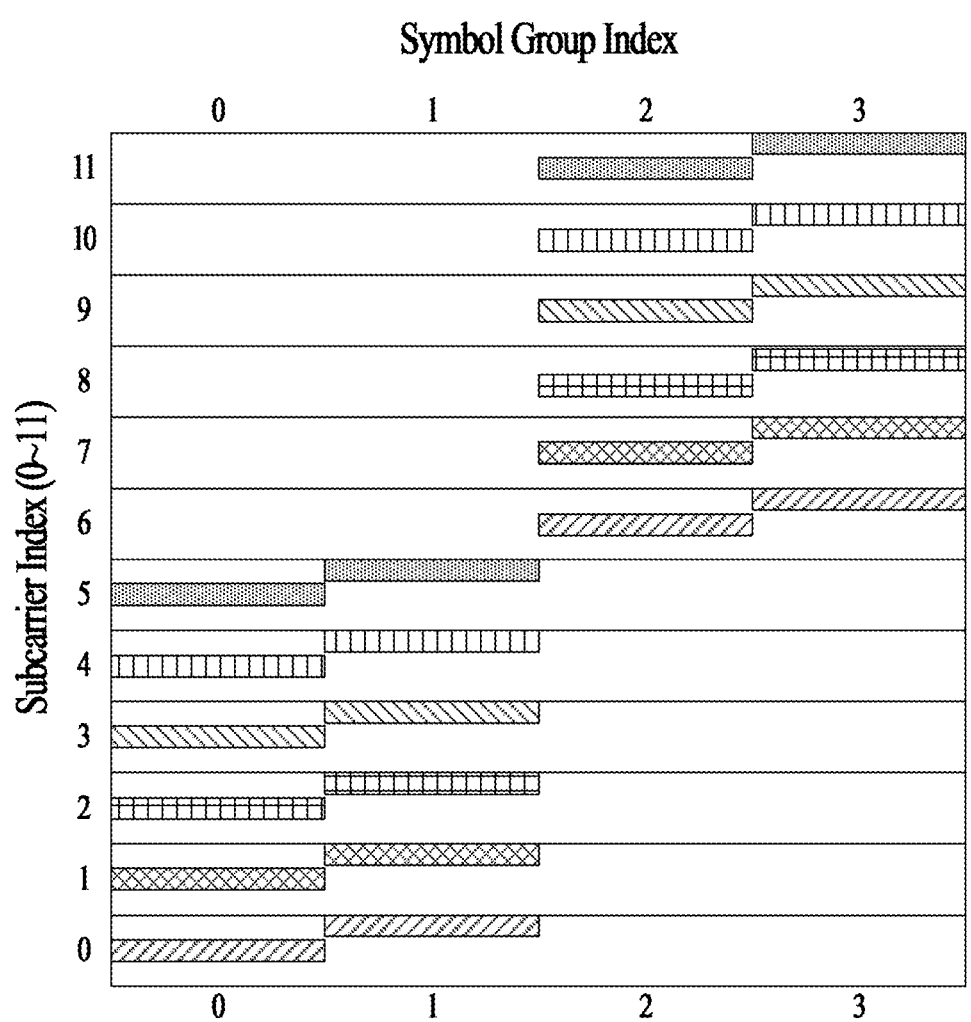
Figure 17:
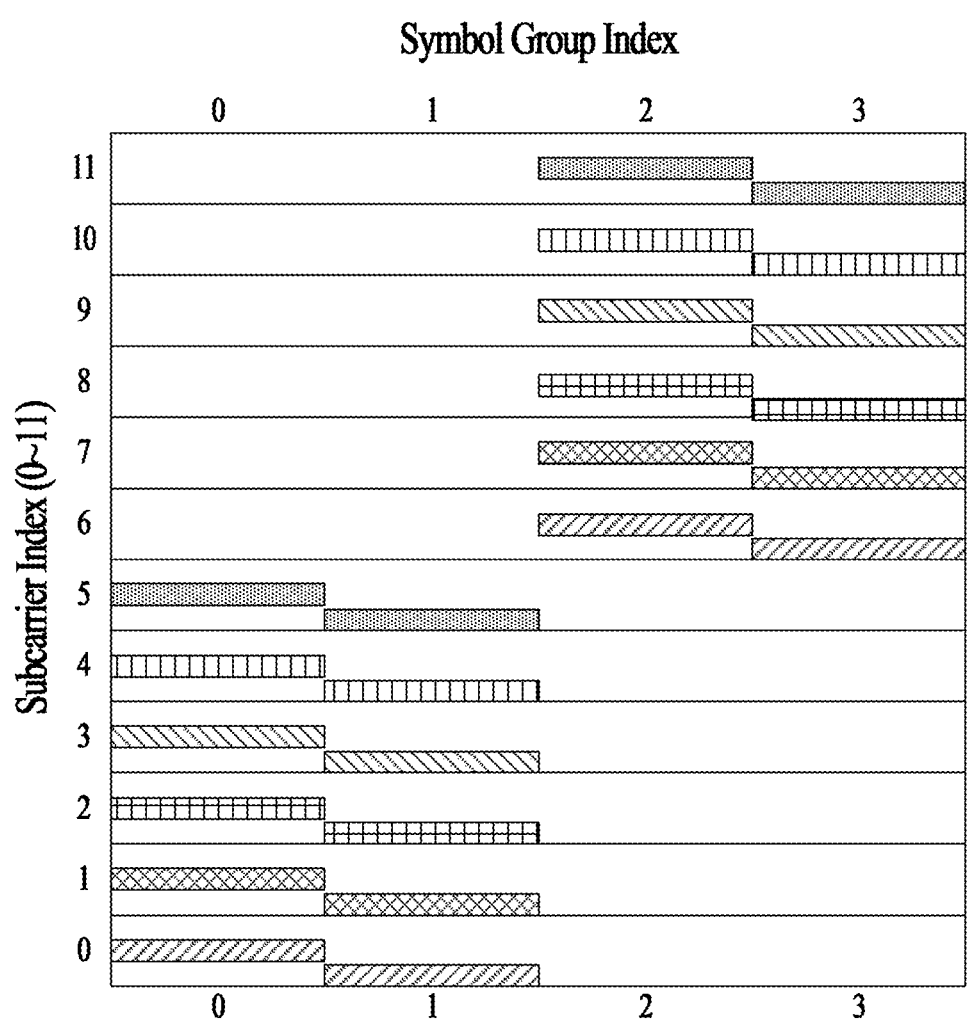

While all of Methods 1-2/1-3/1-3-1/1-4 of the present disclosure are illustrated based on the type of resource allocation and hopping pattern illustrated in FIG. 10, embodiments are not limited thereto. The methods may be applied to various patterns in the same manner/a similar manner. FIGS. 15-17 illustrate various basic patterns to which Methods 1-2/1-3/1-3-1/1-4 of the present disclosure are applicable.

NPRACH Inter-Preamble Frequency Hopping

Methods 1-1/1-2/1-3/1-3-1/1-4 described above are methods for resource allocation and frequency hopping within a preamble. Therefore, Methods 1-1/1-2/1-3/1-3-1/1-4 described above relates to intra-preamble frequency hopping or inter-symbol group frequency hopping. Hereinafter, a pattern of frequency hopping between preambles operated when an enhanced preamble is repeatedly transmitted will be described. Specifically, methods for inter-preamble frequency hopping will be described.

Method 2-1 for NPRACH Inter-Preamble Frequency Hopping

Method 2-1 of the present disclosure is a random inter-preamble frequency hopping method. Random inter-preamble frequency hopping may be applied for inter-cell or inter-UE interference randomization or frequency diversity. Method 2-1 of the present disclosure can mitigate inter-cell or inter-UE interference and improved frequency diversity performance. A random sequence for random inter-preamble frequency hopping may be initialized based on a cell ID, a UE ID, a start time/frequency position, and the like.

Figure 18:
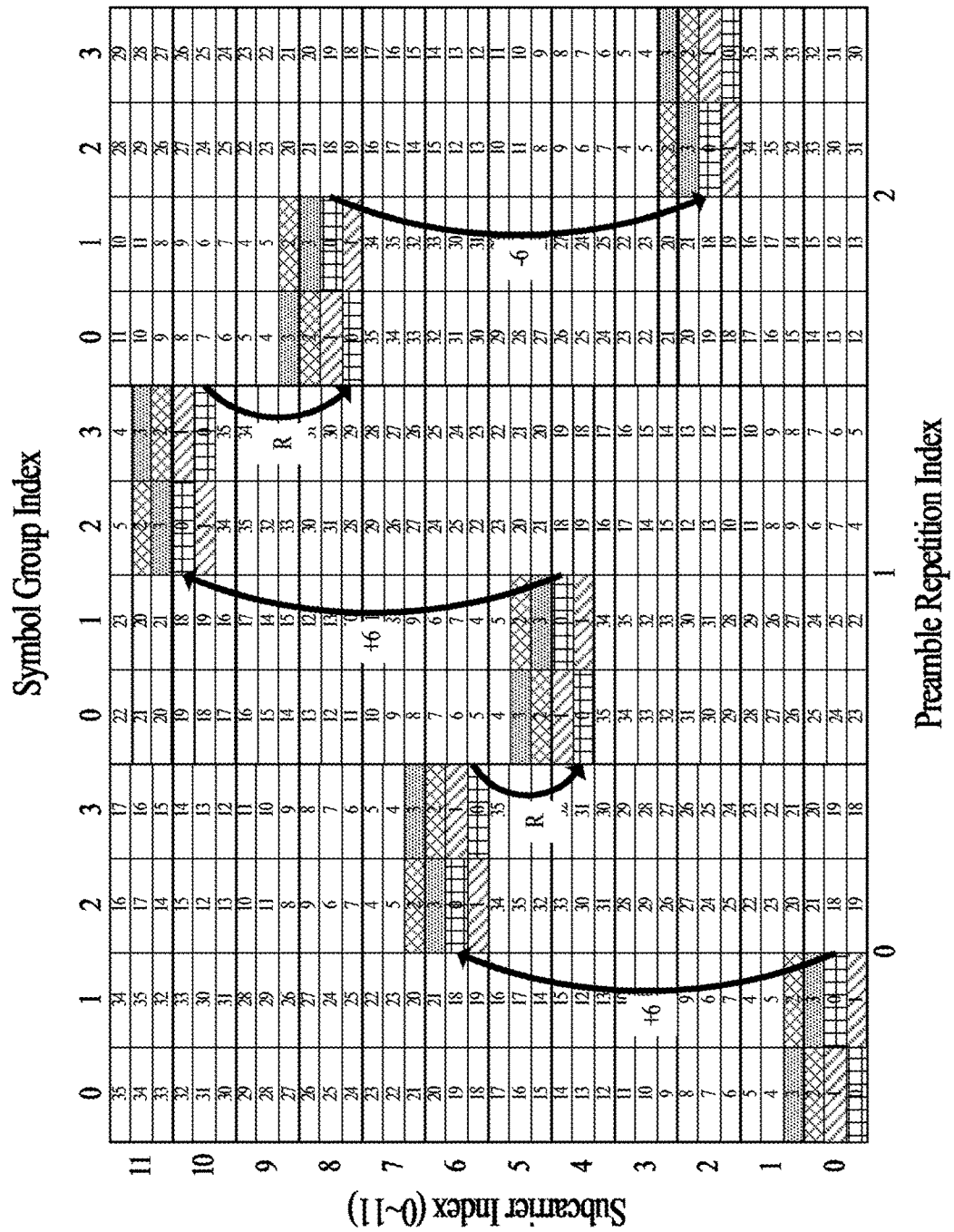

FIG. 18 illustrates random inter-preamble frequency hopping according to Method 2-1 of the present disclosure. While it is assumed that three preambles are repeated in order to describe frequency hopping between preambles, the present disclosure may also be applied to other numbers of preamble repetitions in the same/similar manner. In addition, while it is illustrated that inter-symbol group frequency hopping is performed according to Method 1-4 of the present disclosure in preamble repetition index 0, Methods 1-1/1-2/1-3/1-3-1 of the present disclosure may also be applied. Methods 1-1/1-2/1-3/1-3-1/1-4 of the present disclosure may be applied to other preamble repetition indexes.

Referring to FIG. 18, inter-symbol group frequency hopping is performed according to Method 1-4 of the present disclosure in a specific preamble repetition index, and random frequency hopping is performed between preamble repetitions. R does not represent that a hopping interval is a constant number, but rather a randomly generated integer. Therefore, according to Method 2-1 of the present disclosure, the frequency hopping distance between preamble repetitions may be determined as R*3.75 kHz.

Method 2-1 for NPRACH Inter-Preamble Frequency Hopping

Method 2-2 of the present disclosure is to address the timing estimation issue that may occur when the minimum frequency hopping distance is reduced to 3.75/N kHz. As described above, timing estimation is based on a phase difference between subcarriers. When the minimum frequency hopping distance is reduced, an acquisition range that may be estimated without ambiguity is widened in coarse timing estimation, but the residual error increases after the estimation. As a result, the range may be out of the range of fine timing estimation due to an excessive residual error.

In order to address this issue, Method 2-2 does not randomly generate an inter-preamble frequency hopping value, but is designed to have a value between a minimum frequency hopping distance (e.g., 3.75/N kHz) and a maximum frequency hopping distance (e.g., 6 subcarriers based on 3.75 kHz or 6*3.75 kHz). The value between the minimum frequency hopping distance and the maximum frequency hopping distance is referred to as a medium hopping frequency, and a frequency hopping method using the medium hopping frequency is referred to as medium frequency hopping.

Figure 19:
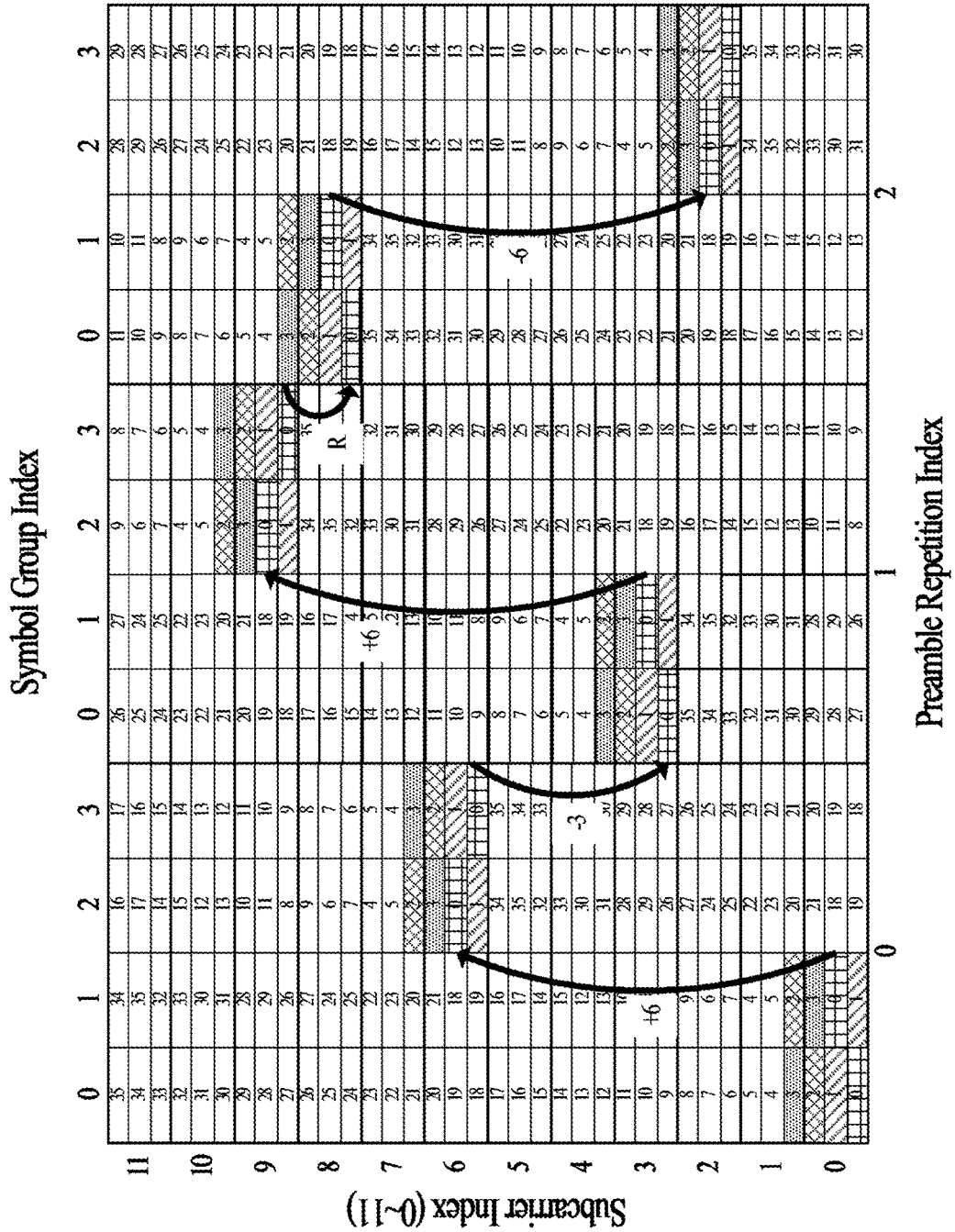

FIG. 19 illustrates an inter-preamble frequency hopping method according to Method 2-2 of the present disclosure. In the example of FIG. 19, the medium hopping frequency is illustrated as being set to 3 subcarriers based on 3.75 kHz, but the present disclosure is not limited thereto. While it is assumed that three preambles are repeated in order to describe frequency hopping between preambles, the present disclosure may also be applied to other numbers of preamble repetitions in the same/similar manner. In addition, while it is illustrated that inter-symbol group frequency hopping is performed according to Method 1-4 of the present disclosure in a preamble, Methods 1-1/1-2/1-3/1-3-1 of the present disclosure may also be applied. Methods 1-1/1-2/1-3/1-3-1/ 1-4 of the present disclosure may be applied to other preamble repetition indexes.

Referring to FIG. 19, inter-symbol group frequency hopping is performed in each preamble according to Method 1-4 of the present disclosure, and frequency hopping between preamble repetitions is performed with an intermediate value (that is, a medium hopping frequency). As shown in FIG. 19, the intermediate value is set to have 3 subcarriers (or 3*3.75 kHz) based on 3.75 kHz, and therefore frequency hopping by 3 subcarriers (or 3*3.75 kHz) based on 3.75 kHz is performed between preamble repetition indexes 0 and 1.

The receiver performs timing estimation in order of coarse timing estimation→medium timing estimation (using an intermediate value of, for example, 3*3.75 kHz)→fine timing estimation. The medium timing estimation using an intermediate value may serve to make the residual error as small as not to cause any problem in fine timing estimation before the fine timing estimation is performed.

FIG. 20 compares Method 2-1 and Method 2-2 of the present disclosure. In FIG. 20, it is assumed that the NPRACH preamble is repeatedly transmitted 8 times. However, the present disclosure is not limited thereto.

Referring to FIG. 20(a), frequency hopping is performed between preambles based on random frequency hopping according to Method 2-1 of the present disclosure. Accordingly, the frequency hopping distance between the subcarrier index on which the last symbol group (e.g., symbol group 3) of the previous preamble is transmitted and the subcarrier index on which the first symbol group (e.g., symbol group 0) of the current preamble is transmitted may be randomly determined. For example, the frequency hopping distance between preambles may be determined according to a random sequence initialized based on a cell ID, a UE ID, a start time/frequency position, and the like.

Referring to FIG. 20(b), in contrast to random inter-preamble frequency hopping, preambles on which frequency hopping is performed so as to have an intermediate value (i.e., a medium hopping frequency) between two preambles are referred to as paired preambles. Random frequency hopping may be performed between the paired preambles, and the purpose of the random frequency hopping and the method of generating the random hopping frequency for the paired preambles may be the same as those of Method 2-1. For example, in the example of FIG. 20(b), frequency hopping may be performed between preambles 0 and 1, between preambles 2 and 3, between preambles 4 and 5, or between preambles 6 and 7 so as to have an intermediate value (e.g., a value between 3.75/N kHz to 3.75*6 kHz), wherein preambles 0 and 1, preambles 2 and 3, preambles 4 and 5, or preambles 6 and 7 correspond to paired preambles. However, random frequency hopping is performed between the paired preambles (e.g., between preambles 1 and 2, between preambles 3 and 4, and between preambles 5 and 6).

In the example of FIG. 20(b), the paired preambles consist of two preambles, but the paired preambles may be configured with a combination of more than two preambles, and different intermediate values may be applied for frequency hopping between preambles within the paired preambles.

When Method 2-1 and Method 2-2 of the present disclosure are applied, frequency hopping between symbol groups in each preamble may be performed according to one or a combination of two or more of Methods 1-1/1-2/1-3/1-3-1/ 1-4.

Method 3: FDM of the Enhanced Preamble and the Legacy Preamble in a Legacy NPRACH Resource The NPRACH resource allocation and frequency hopping methods (Methods 1-1/1-2/1-3/1-3-1/1-4) and the NPRACH inter-preamble frequency hopping methods (Methods 2-1/ 2-2) proposed in the present disclosure may be applied in a situation where both the enhanced preamble and the legacy preamble coexist in a legacy NPRACH resource in an FDM form. More specifically, in the methods of the present disclosure, the NPRACH frequency resources are divided such that some of the resources are allocated to the legacy preamble and the other resources are allocated to the enhanced preamble. Thereby, the methods may support both the enhanced and the legacy preambles at the same time without affecting the operation of the legacy UE in the legacy NPRACH resource configuration region.

Figure 21:
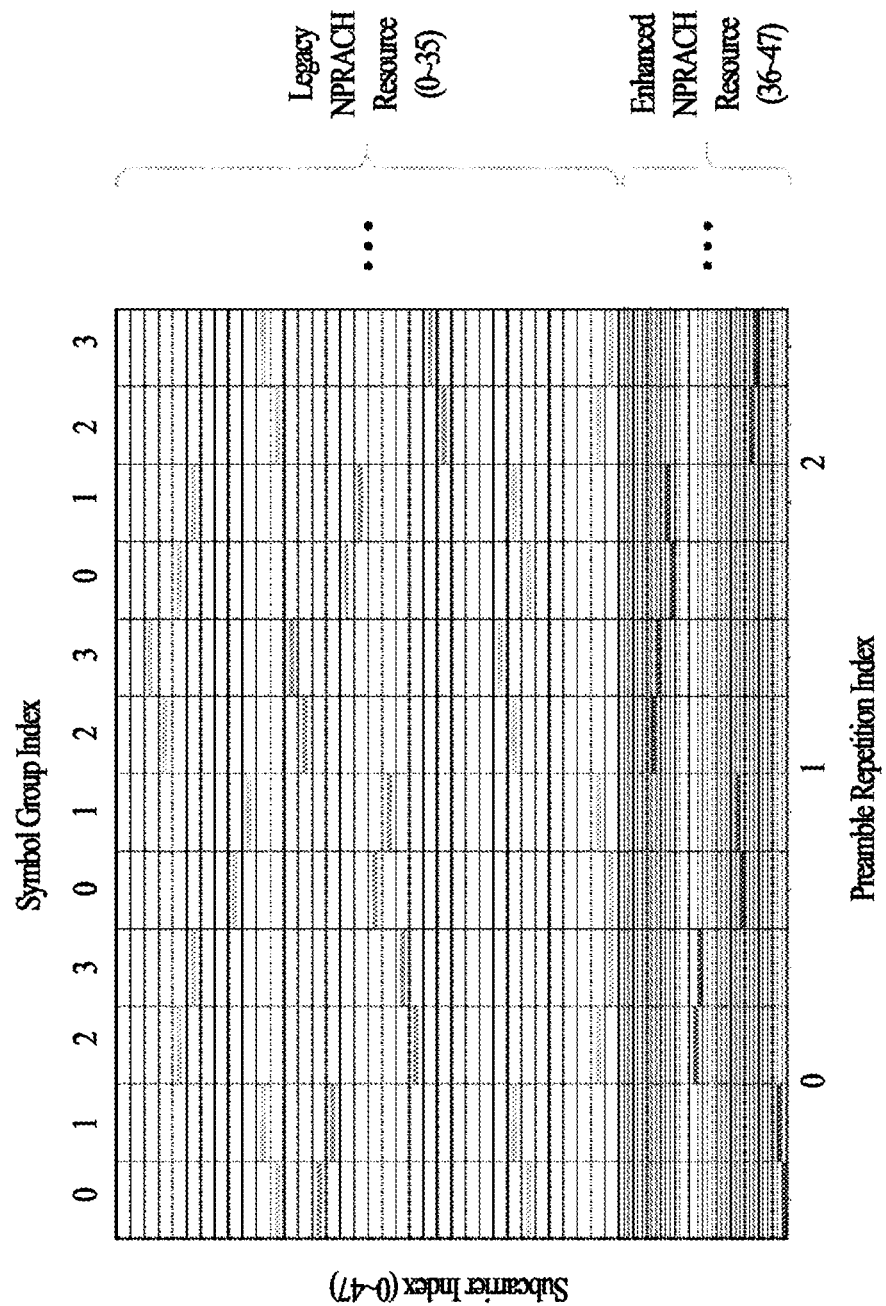
FIG. 21 illustrates an example of dividing NPRACH resources for an enhanced preamble and a legacy preamble according to an FDM scheme.

FIG. 21 illustrates an example of dividing NPRACH resources for an enhanced preamble and a legacy preamble according to an FDM scheme. While it is assumed in the example of FIG. 21 that 48 subcarriers are allocated to the NPRACH (e.g., $N_{sc}^{NPRACH}$ indicates 48), the NPRACH preamble is transmitted through frequency hopping within 12 subcarriers (e.g., $N_{sc}^{RA}$=12), the start subcarrier index (e.g., $n_{start}$) of the NPRACH preamble is determined to be one of 0, 12, 24, or 36, and the preamble is repeatedly transmitted three or more times, the present disclosure is not limited thereto. The illustrated operation may be applied to other NPRACH resource configuration situations in the same/similar manner.

Referring to FIG. 21, 12 subcarrier indexes (e.g., subcarrier indexes 36 to 47) from the highest index among the subcarrier indexes allocated to the NPRACH may be allocated for enhanced preamble transmission, and the remaining subcarriers (e.g., subcarrier indexes 0 to 35) are allocated to legacy preamble transmission such that the legacy NPRACH resource configuration region may be divided in an FDM scheme. In this case, since the enhanced preamble and the legacy preamble are not transmitted in the same time/frequency resource, the influence of interference may be minimized.

FIG. 21 is merely an example. In Method 3 of the present disclosure, subcarriers for the legacy preamble and subcarriers for the enhanced preamble may be distinguished based on another FDM scheme.

Method 4: Method for Sharing an NPRACH Resource Between the Enhanced Preamble and the Legacy Preamble In Method 4 of the present disclosure, a resource mapping method for an enhanced preamble is proposed. When the enhanced preamble and the legacy preamble share the NPRACH resource, NPRACH resource allocation of the enhanced preamble may be performed in the following steps or order:

4-i) Boundary mapping is performed first to avoid collision with the legacy preamble;

4-ii) When the resources are insufficient, collision with the enhanced preamble is allowed; and 4-iii) When the resources are still insufficient, collision with the legacy preamble is finally allowed.

In step 4-i), boundary mapping described in Methods 1-3/1-3-1/1-4 is performed to avoid collision with the legacy preamble. In boundary mapping, resources may be allocated to avoid collision between enhanced preambles or may be allocated to allow collision between enhanced preambles. Alternatively, resource allocation may be sequentially performed to avoid collisions between the enhanced preambles, and then resource allocation may be performed to allow collisions between the enhanced preambles only when resources are insufficient (step 4-ii). A collision between enhanced preambles may be handled by the contention resolution method of the contention-based random access procedure. In addition, in order to improve preamble detection performance, different hopping patterns and/or hopping distances or symbol-/symbol group-level scrambling may be applied for respective UEs.

When the resources are still insufficient even after allowing the collision between the enhanced preambles, the collision with the legacy preamble is allowed (step 4-iii). A collision between an enhanced preamble and a legacy preamble may be basically handled by the contention resolution method of the contention-based random access procedure.

Additionally or alternatively, a method for distinguishing the collision between the enhanced preamble and the legacy preamble through msg 2 (or a RAR message) may be considered. As a method for distinguishing the collision through msg2, an RA-RNTI value different from that of the legacy UE may be used, or an RAPID value of the MAC subheader distinguished from that for the legacy UE may be defined for the enhanced UE.

Method 4-1: The Legacy UE and the Enhanced UE Use Different RA-RNTIs

Method 4-1 is to assign different RA-RNTIs to the legacy UE (or legacy preamble) and the enhanced UE (or enhanced preamble) such that which UE the RAR message is intended for can be identified.

For the legacy UE (or the legacy preamble), the RA-RNTI may be determined based on index information about the first (or starting) radio frame in which repeated transmission of the random access preamble starts. As a specific example, the legacy UE may determine the RA-RNTI based on Equation 11. In Equation 11, SFN_id denotes index information of the first (or starting) radio frame in which repeated transmission of the random access preamble starts, and floor( ) denotes a floor function that floors a number to an integer by deleting below the decimal point. The legacy UE detects the PDCCH using the RA-RNTI determined in this way and receives an RAR message based on the detected PDCCH.

$$RA\text{-}RNTI=1+floor(SFN\_id/4) \quad \text{[Equation 11]}$$

The RA-RNTI for the enhanced UE may be determined by adding a specific offset (e.g., an integer greater than 1) to the RA-RNTI obtained based on Equation 11 so as to be distinguished from the RA-RNTI of the legacy UE. In this case, different RA-RNTI values are determined for the legacy and enhanced UEs. Therefore, when the legacy preamble collides with the enhanced preamble, contention resolution may be effectively performed.

Method 4-2: Distinction by Random Access Preamble Identifier (RAPID)

FIGS. 22(a) and 22(b) illustrate an RAR message header for a legacy UE. FIG. 22(a) shows an RAR message header of a type including a random access preamble identifier (RAPID), and FIG. 22(b) shows an RAR message of a type including a backoff indicator (BI). In FIGS. 22(a) and 22(b), E represents an extension field and indicates whether there is another field thereafter and may have a value of 1. T represents a type field. If the value thereof is 1, this indicates the RAR header of FIG. 22(a). If the value is 0, this indicates the RAR header of FIG. 22(b). BI represents a backoff indicator field and indicates an overload condition of a cell. RAPID represents a random access preamble identifier field and identifies a random access preamble transmitted by the UE. R represents a reserved bit and is set to 0.

In Method 4-2, the enhanced UE may be distinguished from the legacy UE by setting the RAPID for the enhanced UE (enhanced preamble) to a value obtained by adding a specific offset (e.g., an integer greater than 1) and a value corresponding to a subcarrier index at which random access preamble transmission is started.

When a method for distinguishing through Msg2 (Method 4-1 or 4-2) is applied, the enhanced UE may check an enhanced preamble transmission in the msg2 step and perform an operation such as early data transmission, or may early confirm that the base station has received the legacy preamble and perform the next operation. Accordingly, this method has an advantage over the contention resolution method of the conventional contention-based random access procedure.

The legacy preamble and the enhanced preamble have different minimum hopping distances. Accordingly, even if the same start frequency is specified, collision is avoided or collision with another preamble occurs in the next symbol group. Therefore, in step 4-iii), both the legacy preamble and the enhanced preamble unavoidably undergo performance degradation to some extent. To overcome this, an interference randomization method such as symbol or symbol group-level scrambling may be applied.

In addition to or separately from the interference randomization method, in order to improve detection performance while allowing collision with the legacy preamble as in step 4-iii), the frequency hopping distance between symbol groups in the enhanced preamble may be set to a value that is distinct from the maximum frequency hopping distance of the legacy preamble (e.g. 6*3.75 kHz), except the minimum frequency hopping distance. For example, the distinct value may be the medium frequency hopping distance described above (e.g., a value between 3.75/N kHz and 6*3.75 kHz) or a value determined by adding a slight offset to the maximum or medium frequency hopping distance. Here, the offset may be a fixed value to avoid continuous collision with the legacy preamble or may be a value that is changed for each symbol or symbol group for interference randomization.

FIG. 23 illustrates a flowchart of a method for performing a random access procedure according to the present disclosure. For simplicity, the following description will be based on the UE, but a corresponding operation may be performed by the base station.

Referring to FIG. 23, in step S2302, the UE receives NPRACH configuration information. For example, as described with reference to FIG. 6, NPRACH configuration information may be received through a higher layer signal (e.g., an RRC layer signal) or system information (e.g., SIB2), and may include information (e.g., $N_{scoffset}^{NPRACH}$ or nprach-SubcarrierOffset) indicating the first subcarrier of the NPRACH resource in the frequency domain, information (e.g., $N_{sc}^{NPRACH}$ or nprach-NumSubcarriers) indicating the number of subcarriers allocated to the NPRACH, and information (e.g., $N_{rep}^{NPRACH}$ or numRepetitionsPerPreambleAttempt) indicating the number of NPRACH repetitions.

The UE may determine a frequency region allocated to NPRACH transmission based on the received NPRACH configuration information. For example, as described with reference to FIG. 6, the UE may determine, based on the information received through the NPRACH configuration information, a subcarrier region in which a random access preamble is to be transmitted (e.g., see Equation 2). For example, the determined frequency region may include multiple subcarriers (e.g., $N_{sc}^{RA}=12$) starting from a start subcarrier index (e.g., $n_{start}$) among the subcarriers allocated to the NPRACH (e.g., $N_{sc}^{NPRACH}$ subcarriers).

In operation S2304, the UE may transmit a random access preamble based on the received NPRACH configuration information. The random access preamble transmitted in operation S2304 may include an enhanced preamble. As described regarding the enhanced preamble format (see FIG. 8 and related description), the enhanced preamble may refer to a preamble including E-CP (see Equation 8 and related description), and/or a preamble for which subcarrier spacing is set to 3.75 kHz/N (where N is an integer satisfying N>3).

For example, when Methods 1-3/1-3-1/1-4 of the present disclosure are applied, each subcarrier may be divided into a center frequency region and a boundary frequency region. When the random access preamble is a legacy preamble, the preamble may be mapped to/transmitted in the center frequency region. When the random access preamble is an enhanced preamble, the preamble may be mapped to/transmitted in the boundary frequency region. Alternatively, when Methods 1-3/1-3-1/1-4 of the present disclosure are applied, each subcarrier may be divided into a center frequency region and a boundary frequency region. When the UE is a legacy UE, the random access preamble may be mapped to/transmitted in the center frequency region. When the UE is an enhanced UE, the random access preamble may be mapped to/transmitted in the boundary frequency region.

In addition, for example, when Methods 1-1/1-2/1-3/1-3-1/1-4 of the present disclosure are applied, the minimum frequency hopping distance for the enhanced preamble may be set to 3.75/N kHz, where N may be an integer greater than or equal to 3. In contrast, the minimum frequency hopping distance for the legacy preamble may be set to 3.75 kHz. The maximum frequency hopping distance for the enhanced preamble may be set to 6*3.75 kHz, and the maximum frequency hopping distance for the legacy preamble may also be set to 6*3.75 kHz.

When Methods 1-1/1-2/1-3/1-3-1/1-4 of the present disclosure are applied on the assumption that the enhanced preamble includes symbol groups 0 to 3, the frequency hopping distance between symbol group 0 and symbol group 1 and/or the frequency hopping distance between symbol group 2 and symbol group 3 may be set to 3.75/N kHz, and the frequency hopping distance between symbol group 1 and symbol group 2 may be set to 6*3.75 kHz. Alternatively, as described in Method 4 of the present disclosure, the frequency hopping distance between symbol group 0 and symbol group 1 and/or the frequency hopping distance between symbol group 2 and symbol group 3 may be set to 3.75/N kHz, but the frequency hopping distance between symbol group 1 and symbol group 2 may be set to a value other than 6*3.75 kHz. For example, a value other than 6*3.75 kHz may be set to a medium frequency hopping distance value (e.g., a value between 3.75/N kHz and 6*3.75 kHz) or may be a value determined by adding a specific offset (e.g., the spacing of one or more subcarriers or an integer greater than 1 as a subcarrier index) to the maximum or medium frequency hopping distance.

When the random access preamble is repeatedly transmitted in the method of FIG. 23, the random access preamble may be transmitted based on frequency hopping between preambles according to Method 2-1 and/or Method 2-2 of the present disclosure. For example, when Method 2-1 of the present disclosure is applied, a frequency hopping distance between repeatedly transmitted random access preambles may be randomly determined. As another example, when Method 2-2 of the present disclosure is applied, the frequency hopping distance between repeatedly transmitted random access preambles may be determined to be a value between 3.75/N kHz and 6*3.75 kHz. Alternatively, when the random access preamble includes paired preambles consisting of at least two preambles (e.g., see FIG. 20 and related descriptions), the frequency hopping distance between the paired preambles may be randomly determined, and the frequency hopping distance between the random access preambles of the paired preambles may be determined as a value between 3.75/N kHz and 6*3.75 kHz.

When the enhanced preamble and the legacy preamble are transmitted through the same NPRACH resource, they may be distinguished by applying Method 4-1 and/or Method 4-2 of the present disclosure. For example, when Method 4-1 of the present disclosure is applied, the UE may receive a random access response message using different RA-RNTIs for the enhanced preamble and the legacy preamble in response to the random access preamble. As another example, when Method 4-2 of the present disclosure is applied, the random access response message may have different random access preamble identifiers (RAPIDs) for the enhanced preamble and the legacy preamble.

In addition, other methods proposed in the present disclosure may be applied to the method of FIG. 23. For example, the base station may perform timing estimation according to the methods described in the methods of the present disclosure (e.g., Methods 1-3/1-3-1/2-2).

Figure 24:
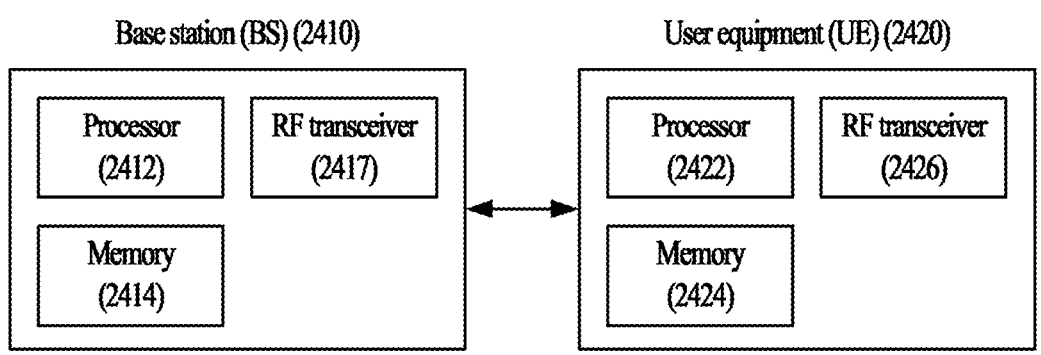
FIG. 24 illustrates a base station and a user equipment to which the present disclosure is applicable.

FIG. 24 illustrates a base station and a user equipment to which the present disclosure is applicable.

Referring to FIG. 24, a wireless communication system includes a base station (BS) 2410 and a user equipment (UE) 2420. If the wireless communication system includes a relay, the base station or the UE may be replaced with the relay.

The base station 2410 includes a processor 2412, a memory 2414, and a radio frequency (RF) transceiver 2416. The processor 2412 may be configured to implement the procedures and/or methods proposed in the present disclosure. The memory 2414 is connected to the processor 2412 and stores various kinds of information related to the operation of the processor 2412. The RF transceiver 2416 is connected to the processor 2412 and transmits and/or receives wireless signals. The UE 2420 includes a processor 2422, a memory 2424, and an RF transceiver 2426. The processor 2422 may be configured to implement the procedures and/or methods proposed in the present disclosure. The memory 2424 is connected to the processor 2422 and stores various kinds of information related to the operation of the processor 2422. The RF transceiver 2426 is connected to processor 2422 and transmits and/or receives wireless signals.

The above-described embodiments are combinations of the elements and features of the present disclosure in a predetermined form. Each element or feature is to be considered optional unless stated otherwise. Each element or feature may be embodied without being combined with other elements or features. It is also possible to combine some of the elements and/or features to form an embodiment of the present disclosure. The order of the operations described in the embodiments of the present disclosure may be changed. Some elements or features of one embodiment may be included in another embodiment or may be replaced with corresponding elements or features of another embodiment. It is apparent to those skilled in the art that claims that are not explicitly cited in each other in the appended claims may be presented in combination as an embodiment of the present disclosure or included as a new claim by a subsequent amendment after the application is filed.

A specific operation described as being performed by the base station may be performed by an upper node of the base station. Namely, it is apparent that, in a network comprised of a plurality of network nodes including a base station, various operations performed for communication with a UE may be performed by the base station, or network nodes other than the base station.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present disclosure may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present disclosure without departing from the scope of the invention. Thus, it is intended that the present disclosure cover the modifications and variations of this invention provided they come within the scope of the appended claims and their equivalents.

The present disclosure is applicable to a wireless communication apparatus such as a user equipment, a base station, etc.

What is claimed is:

1. A method of performing a random access procedure by a user equipment in a wireless communication system, the method comprising:
    receiving narrowband physical random access channel (NPRACH) configuration information; and
    transmitting random access preambles repeatedly based on the received NPRACH configuration information,
    wherein a subcarrier spacing for the random access preambles is set to 1.25 kHz,
    wherein each of the random access preambles comprises a plurality of symbol groups including symbol group 0, symbol group 1, symbol group 2, and symbol group 3, the plurality of symbol groups being transmitted based on frequency hopping,
    wherein, in each of the random access preambles, a frequency hopping distance between the symbol group 0 and the symbol group 1 and a frequency hopping distance between the symbol group 2 and the symbol group 3 are set to 1.25 kHz, and wherein a frequency hopping distance between the symbol group 1 and the symbol group 2 is set to 6*3.75 kHz, and
    wherein a frequency hopping distance between the symbol group 3 in one of the random access preambles and the symbol group 0 in a next random access preamble is set to 3*3.75 kHz.

2. The method of claim 1, wherein an NPRACH resource comprises 36 subcarriers, and
    wherein the frequency hopping is performed within the 36 subcarriers.

3. A user equipment for performing a random access procedure in a wireless communication system, the user equipment comprising:
    a radio frequency (RF) transceiver; and
    a processor operatively connected to the RF transceiver,
    wherein the processor is configured to:
    receive narrowband physical random access channel (NPRACH) configuration information, and transmit random access preambles repeatedly based on the received NPRACH configuration information,
    wherein a subcarrier spacing for the random access preambles is set to 1.25 kHz,
    wherein each of the random access preambles comprises a plurality of symbol groups including symbol group 0, symbol group 1, symbol group 2, and symbol group 3, the plurality of symbol groups being transmitted based on frequency hopping,
    wherein, in each of the random access preambles, a frequency hopping distance between the symbol group 0 and the symbol group 1 and a frequency hopping distance between the symbol group 2 and the symbol group 3 are set to 1.25 kHz, and wherein a frequency hopping distance between the symbol group 1 and the symbol group 2 is set 6*3.75 kHz, and,
    wherein a frequency hopping distance between the symbol group 3 in one of the random access preambles and the symbol group 0 in a next random access preamble is set to 3*3.75 kHz.

4. The user equipment of claim 3, wherein an NPRACH resource comprises 36 subcarriers,
    wherein the frequency hopping is performed within the 36 subcarriers.

* * * * *